US005408866A

United States Patent [19]

Kawamura et al.

[11] Patent Number: 5,408,866

[45] Date of Patent: Apr. 25, 1995

[54] LEAK DIAGNOSIS SYSTEM FOR EVAPORATIVE EMISSION CONTROL SYSTEM

[75] Inventors: Katsuhiko Kawamura, Yokohama; Osamu Matsuno, Ebina; Yoichi Kishimoto, Chigasaki, all of Japan

[73] Assignee: Nissan Motor Co., Ltd., Yokohama, Japan

[21] Appl. No.: 153,516

[22] Filed: Nov. 17, 1993

[30] Foreign Application Priority Data

Nov. 25, 1992 [JP] Japan .................................. 4-315087
Dec. 16, 1992 [JP] Japan .................................. 4-335859

[51] Int. Cl.[6] ........................ F02M 33/02; G01M 3/26

[52] U.S. Cl. ........................................ 73/40; 73/49.7; 73/118.1; 123/516; 123/518

[58] Field of Search .............. 73/40, 40.5, 49.7, 118.1; 123/516, 518, 520

[56] References Cited

U.S. PATENT DOCUMENTS

| | | | |
|---|---|---|---|
| 5,085,197 | 2/1992 | Mader et al. | 123/516 |
| 5,146,902 | 9/1992 | Cook et al. | 123/518 |
| 5,150,689 | 9/1992 | Yano et al. | 123/519 |
| 5,174,265 | 12/1992 | Sekine | 123/520 |
| 5,182,945 | 2/1993 | Setter | 73/118.10 |
| 5,220,822 | 6/1993 | Tuma | 73/40.5 R |
| 5,245,973 | 9/1993 | Otsuka et al. | 123/518 |
| 5,251,477 | 10/1993 | Nakashima et al. | 73/118.10 |
| 5,261,379 | 11/1993 | Lipinski et al. | 123/520 |
| 5,284,050 | 2/1994 | Iida et al. | 73/118.10 |
| 5,297,529 | 3/1994 | Cook et al. | 123/520 |

*Primary Examiner*—Hezron E. Williams
*Assistant Examiner*—J. David Wiggins
*Attorney, Agent, or Firm*—Lowe, Price, LeBlanc & Becker

[57] ABSTRACT

A leak diagnosis system which diagnoses a leak condition of an evaporative emission control system for an internal combustion engine. The leak diagnosis system detects a changing speed of a pressure in the evaporative emission control system for plural times during when the evaporative emission control system is put into a negative pressure condition by the negative pressure of the engine and is then closed by a purge-cut valve. The leak diagnosis system diagnoses a leak condition of the evaporative emission control system according to the detected plural pressure changing speeds while taking a fuel condition in the evaporative emission control system into consideration on the basis of the detected plural pressure changing speeds. Accordingly, the leak condition in the evaporative emission control system is accurately diagnosed without being effected by the fuel condition.

15 Claims, 24 Drawing Sheets

LEAK DIAGNOSIS SYSTEM FOR EVAPORATIVE EMISSION CONTROL SYSTEM

BACKGROUND OF THE INVENTION

1. Field of the Invention

The present invention relates to a leak diagnosis system for an evaporative emission control system applied to an internal combustion engine, and more particularly to a leak diagnosis system which diagnoses a leakage of evaporative fuel from an evaporative emission control system for an internal combustion engine of an automotive vehicle.

2. Description of the Prior Art

A variety of evaporative emission control systems for automotive vehicles have been proposed and practically used. A typical evaporative emission control system is provided with a charcoal canister for preventing evaporative fuel in a fuel tank from being purged into the atmosphere. In this emission control system the charcoal canister adsorbs evaporative fuel from the fuel tank and purged into the engine by utilizing the negative pressure generated by the internal combustion engine.

However, such an emission control system has a possibility that evaporative fuel is purged into the atmosphere if a leakage hole is generated at an evaporative fuel conduit or if an unsealed portion is generated at a connecting portion of the evaporative fuel conduit. If such an inferiority is generated in the evaporative emission control system, it is impossible that the evaporative emission control system is sufficiently operated. In order to prevent such troubles, EPA (Environmental Protection Agency) and CARB (California Air Resources Board) have proposed a leakage diagnosis system and a practical method thereof. Such a leak diagnosis system proposed by such organizations is shown in FIG. 24 and a flowchart for controlling the diagnosis system is shown in FIG. 25. As shown in FIG. 24, an end of an evaporative fuel conduit 102*a* is connected to a fuel tank 101, and the other end of the evaporative fuel conduit 102*a* is connected to a charcoal canister 103 adsorbing evaporative fuel. A pressure sensor 106 is disposed in the way of the evaporative fuel conduit 102*a* in order to detect a pressure in the evaporative fuel conduit 102*a*. The signal from the pressure sensor 106 is inputted into an engine control unit 150 such that a PCS (pressure changing speed) in the evaporative fuel conduit 102*a* is obtained. The engine control unit 150 has previously stored a decision value for diagnosing a leakage of evaporative fuel and implements the diagnosis by comparing the PCS with the decision value. An end of an evaporative fuel conduit 102*b* is connected to the charcoal canister 103, and the other end of the evaporative fuel conduit 102*b* is connected to an intake side of the internal combustion engine. A purge-cut valve 104 is disposed in the way of the evaporative fuel conduit 102*b*. The evaporative fuel adsorbed in the charcoal canister 103 is purged into the internal combustion engine during an engine operating condition upon opening the purge-cut valve 104. A drain-cut valve 105 is connected to a bottom of the charcoal canister 103 so as to cut the communication between the charcoal canister 103 and the atmosphere during the leak diagnosis.

Such a conventional leak diagnosis system implements the leak diagnosis according to the flow chart of FIG. 25 as follows.

In a step S110 the purge-cut valve 104 is opened during a predetermined engine operating condition, so that the evaporative fuel adsorbed in the charcoal canister 103 is purged into the engine due to intake negative pressure generated in the engine.

In a step S120 the drain-cut valve 105 is closed such that the negative pressure of the engine is applied to the evaporative emission control system.

In a step S130 the engine control unit 150 detects the pressure in the evaporative emission control system during a sucking operation as mentioned above, on the basis of the signal of the pressure sensor 106. It will be understood that a time period from the start of the suction by the engine until a predetermined negative pressure may be used as a signal instead of the PCS. That is, in the step S130 it is judged whether the pressure reaches a predetermined pressure or not, or whether a predetermined time has elapsed from the start of the sucking operation.

In a step S140, the purge-cut valve 4 is closed.

In a step S150, the engine control unit 150 monitors the pressure change in the inner space on the basis of the signal of the pressure sensor 6 and detects a pressure changing speed (PCS) or pressure buildup speed toward the atmospheric pressure.

In a step S160, it is judged whether the detected pressure buildup speed is larger than the decision value or not. When the judgment in the step S160 is "YES", the program proceeds to a step S170 wherein it is judged that the system is in a leak condition. When the judgment in the step S160 is "NO", the program proceeds to a step S180 wherein it is judged that the system is in a no-leak condition.

Following the operation of the step S170 or S180, the program proceeds to a step S190 wherein the drain-cut valve 105 is opened.

However, the PCS (pressure changing speed) in the evaporative emission control system takes various values due to the fuel condition in the evaporative emission control system, such as the change of the inner space volume which changes according to the remaining amount of fuel in the fuel tank, as shown in FIG. 26 and the change of the generating amount of fuel vapor which changes according to the fuel temperature, as shown in FIG. 27. Accordingly, it is desired to accurately diagnose the leakage condition of the evaporative emission control system without being effected by the fuel condition in the evaporative emission control system such as the remaining amount of the fuel in the fuel tank and the fuel temperature.

SUMMARY OF THE INVENTION

It is an object of the present invention to provide an improved leak diagnosis system which accurately diagnoses an evaporative fuel leak condition of an evaporative emission control system for an internal combustion engine of an automotive vehicle without being effected by the remaining amount of the fuel in the fuel tank of the automotive vehicle.

Another object of the present invention is to provide an improved leak diagnosis system which accurately diagnoses a leak condition with due regards to a generation of the fuel vapor due to the increase of the temperature of the fuel in the tank.

A leak diagnosis system according to the present invention is for an evaporative emission control system of an internal combustion engine. The leak diagnosis system comprises a pressure detecting means which detects a pressure in the evaporative emission control system connected to an intake system of the internal combustion engine. A leak diagnosis means has a pressure changing speed calculating means which calculates the pressure changing speed on the basis of the signal from said pressure detecting means and a fuel condition detecting means which obtains a fuel condition in the evaporative emission control system according to the pressure changing speed. The leak diagnosis means diagnoses the leak condition in the evaporative emission control system according to the fuel condition and the pressure changing speed.

With this arrangement, the leak condition in the evaporative emission control system is accurately diagnosed without being effected by the fuel condition.

BRIEF DESCRIPTION OF THE DRAWINGS

In the drawings, like reference numerals designate like elements and parts all through the figures, in which.

DETAILED DESCRIPTION OF THE INVENTION

Referring to FIGS. 1 to 6, there is shown a first embodiment of a leak diagnosis system for an evaporative emission control system in an internal combustion engine for an automotive vehicle, in accordance with the present invention.

Figure 1:
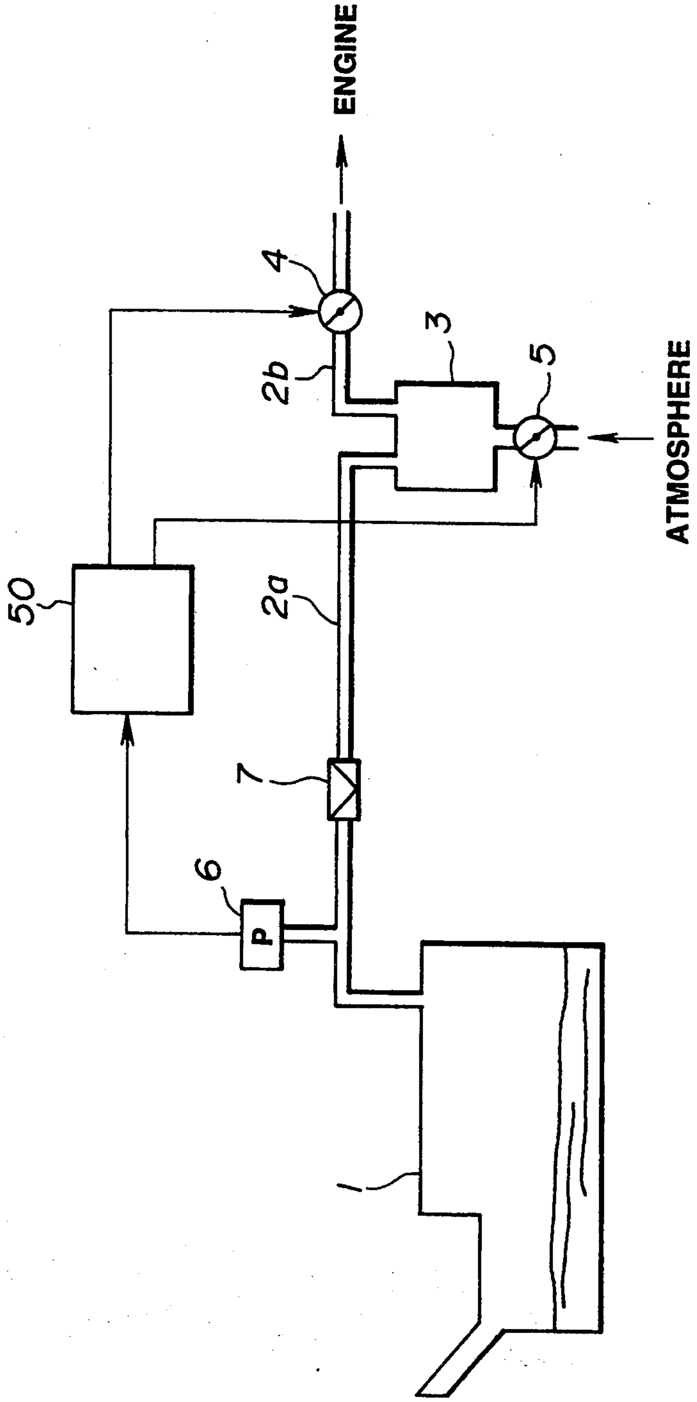
FIG. 1 is a schematic view which shows a construction of a first embodiment of a leak diagnosis system for an evaporative emission control system according to the present invention.

As shown in FIG. 1, an end of a first evaporative fuel conduit 2*a* is connected to an upper end portion of a fuel tank 1. The other end of the first evaporative fuel conduit 2*a* is connected to a charcoal canister 3 which temporally absorbs and stores evaporative fuel from the fuel tank 1. A pressure sensor 6 functioning as a pressure detecting means is disposed in the first evaporative fuel conduit 2*a* and communicated with an engine control unit 50. A check valve 7 is disposed in the first evaporative fuel conduit 2*a* and functions to effectively supply evaporative fuel to the charcoal canister 3 in such a manner that the check valve 7 is opened when a pressure difference between the fuel tank 1 and the charcoal canister 3 becomes larger than a predetermined value while preventing evaporative fuel from flowing from canister side to the fuel tank side. An end of a second evaporative fuel conduit 2*b* is connected to the charcoal canister 3, and the other end of the second evaporative fuel conduit 2*b* is connected to an intake side of the internal combustion engine. A purge-cut valve 4 is disposed in the way of the second evaporative fuel conduit 2*b* and is electrically communicated with the engine control unit 50. The evaporative fuel adsorbed in the charcoal canister 3 is purged into the internal combustion engine during an engine operating condition upon opening the purge-cut valve 4. A drain-cut valve 5 is connected to a bottom of the charcoal canister 3 so as to cut the communication between the charcoal canister 3 and the atmosphere during the leak diagnosis. The drain-cut valve 5 is electrically communicated with the engine control unit 50 so as to be controlled thereby.

A signal outputted from the pressure sensor 6 is inputted in the engine control unit 50 in which the change of the pressure in the closed evaporative emission control system is monitored so as to calculate a PCS (pressure changing speed) of the closed evaporative emission control system according to the signal from the pressure sensor 6.

Figure 5:
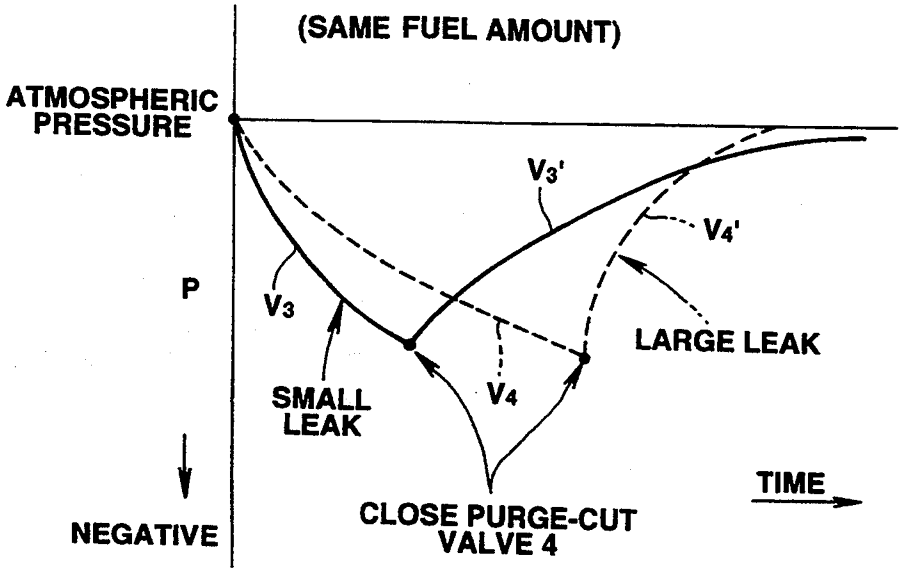
FIG. 5 is another time chart in which a change of the pressure in the evaporative emission control system under a predetermined fuel remaining condition is compared.
Figure 6:
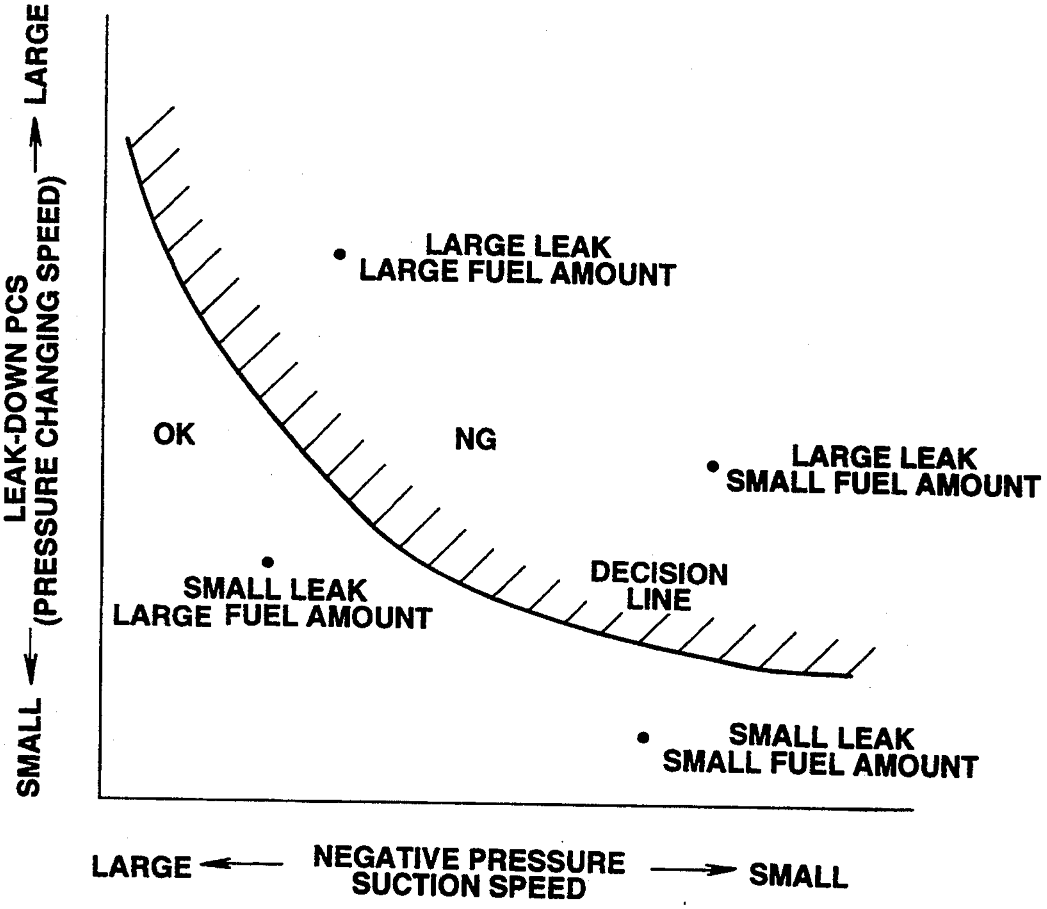
FIG. 6 is a map used in the first embodiment for a decision of the leakage in the evaporative emission control system.

A map shown in FIG. 6 is for diagnosing the leakage of evaporative fuel in the evaporative emission control system and is previously stored in a memory of the engine control unit 50. The engine control unit 50 is arranged to diagnose the leak condition of the evaporative emission control system on the basis of the map and the calculated PCS. The map has been determined by a rule that the pressure drop speed and the pressure buildup speed are characterizingly changed respectively according to the leak amount of evaporative fuel and the fuel amount remained in the fuel tank 1. That is, in case that a leak amount is constant at a predetermined level, when the remaining fuel amount in the fuel tank is large, both of the pressure drop speed V1 and the pressure buildup speed V1' become high as shown by a continuous line in FIG. 4. Also, when the remaining fuel amount in the fuel tank is small, both of the pressure drop speed V2 and pressure buildup speed V2' become low as shown by a broken line in FIG. 4. On the other hand, in case that the remaining fuel amount in the fuel tank 1 is constant at a predetermined level, when the leak amount is small, the pressure drop speed V3 becomes high and the pressure buildup speed V3' becomes small as shown by a continuous line in FIG. 5. Also, when the leak amount is large, a pressure drop speed V4 becomes small and the pressure buildup speed V4' become high as shown by a broken line in FIG. 5. Accordingly, the leak amount is determined by obtaining the pressure drop speed and the pressure buildup speed, and the decision line in the map of FIG. 6 is determined such that an area located above the decision line is defined as a leak area in which the leak amount of evaporative fuel is larger than a decision value.

Figure 3:
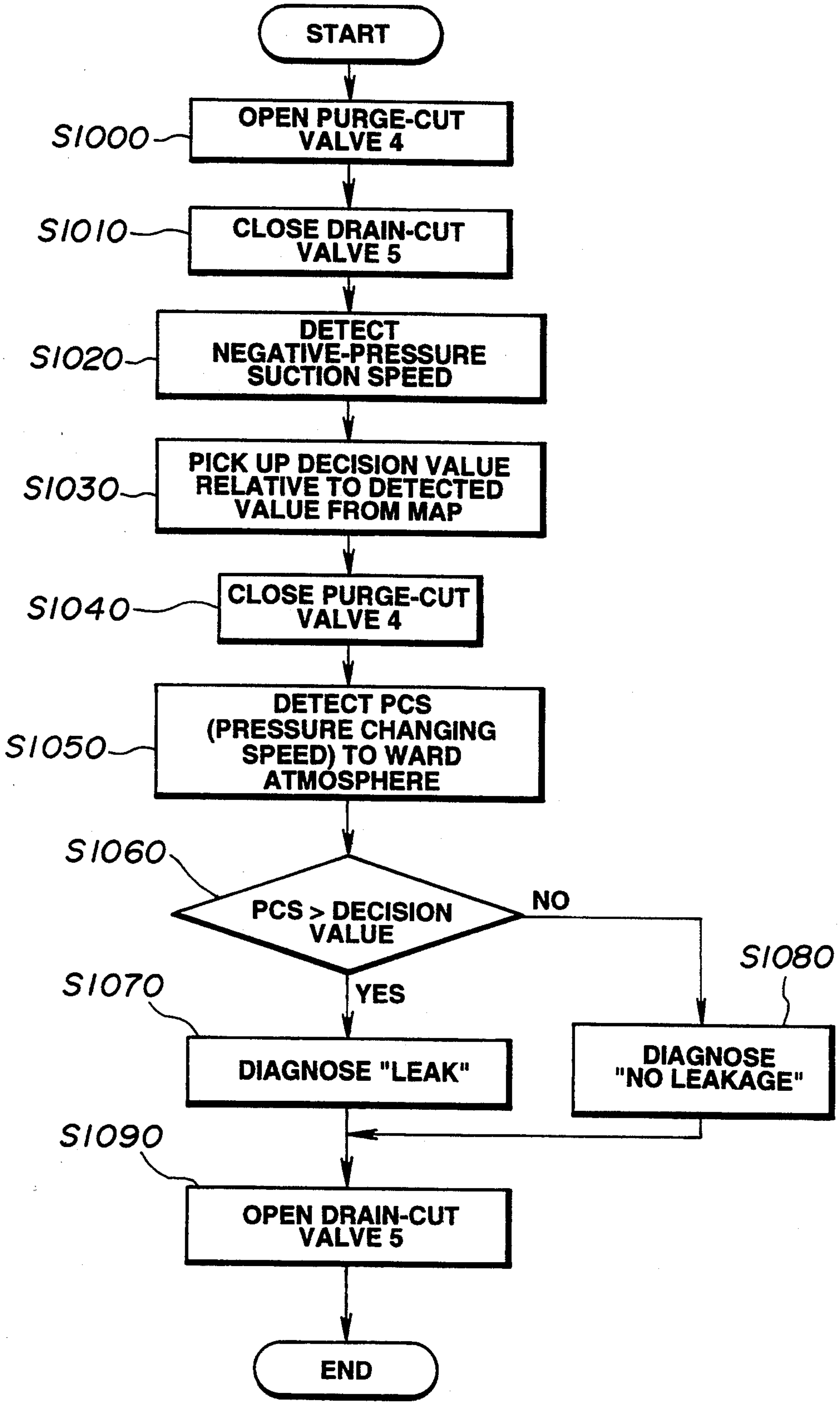
FIG. 3 is a flow chart applied to a control of the first embodiment of FIG. 1.

A diagnosis of the leakage of the evaporative fuel conduit is implemented by the engine control unit 50 according to a flow chart shown in FIG. 3.

In a step S1000 the purge-cut valve 4 is opened during a predetermined engine operating condition, so that the evaporative fuel adsorbed in the charcoal canister 3 is purged into the engine due to intake negative pressure generated in the engine.

In a step S1010 the drain-cut valve 5 is closed such that the negative pressure of the engine is applied to an evaporative emission control system constituted by the evaporative fuel conduits **2*a* and 2*b*, the charcoal canister 3 and the fuel tank 1**.

Figure 4:
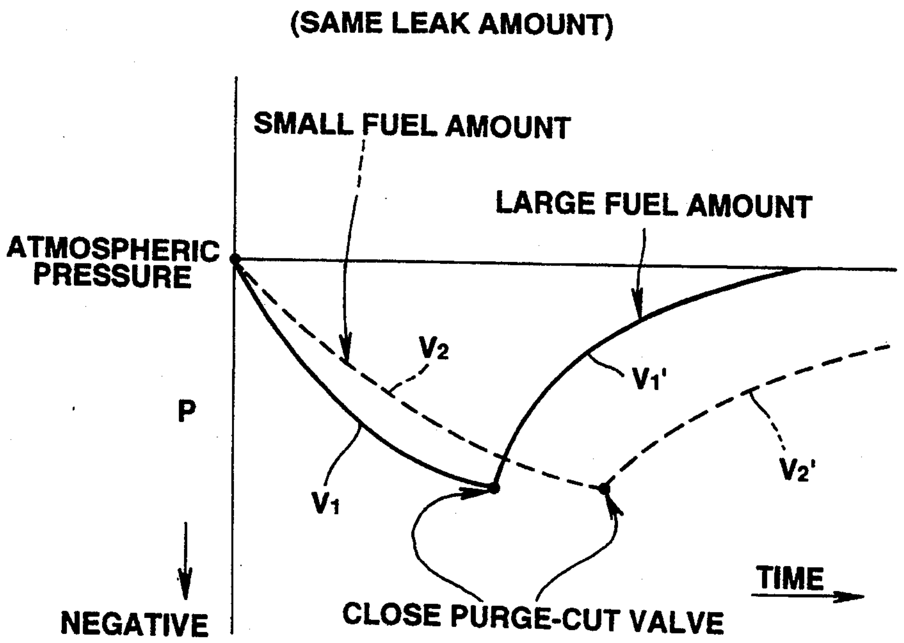
FIG. 4 is a time chart in which a change of the pressure in the evaporative emission system under a predetermined leak amount is compared.

In a step S1020 the engine control unit 50 detects the pressure drop speed in the evaporative conduit during a sucking operation mentioned above, on the basis of the signal of the pressure sensor 6, as shown in FIGS. 4 and 5. It will be understood that instead of the pressure drop speed a time period spans from the start of the suction by the engine until a predetermined negative pressure.

In a step S1030, the decision value of the pressure buildup speed in the inner space volume, which is defined by closing the purge-cut valve 4, is picked up relative to the pressure drop speed from the map.

In a step S1040, the purge-cut valve 4 is closed.

In a step S1050, the engine control unit 50 monitors the pressure change in the inner space on the basis of the signal of the pressure sensor 6 as shown in FIGS. 4 and 5 and detects the pressure changing speed (PCS) or pressure buildup speed toward the atmospheric pressure.

In a step S1060, it is judged whether the detected pressure buildup speed is larger than the decision value or not. When the judgment in the step S1060 is "YES", the program proceeds to a step S1070 wherein it is judged that the system is in a leak condition. When the judgment in the step S1060 is "NO", the program proceeds to a step S1080 wherein it is judged that the system is in a no-leak condition. The steps S1030, S1060, S1070 and S1080 constitute an evaporative fuel leak diagnosis means.

Following the operation of the step S1070 or S1080, the program proceeds to a step S1090 wherein the drain-cut valve 5 is opened.

With the thus arranged leak diagnosis system, by using only the pressure sensor 6 as a detecting means, the pressure drop speed and the pressure buildup speed are detected. Furthermore, the leak diagnosis of the evaporative fuel in the evaporative emission control system is finely implemented while removing the effect of the amount of the fuel remained in the fuel tank 1.

Figure 2:
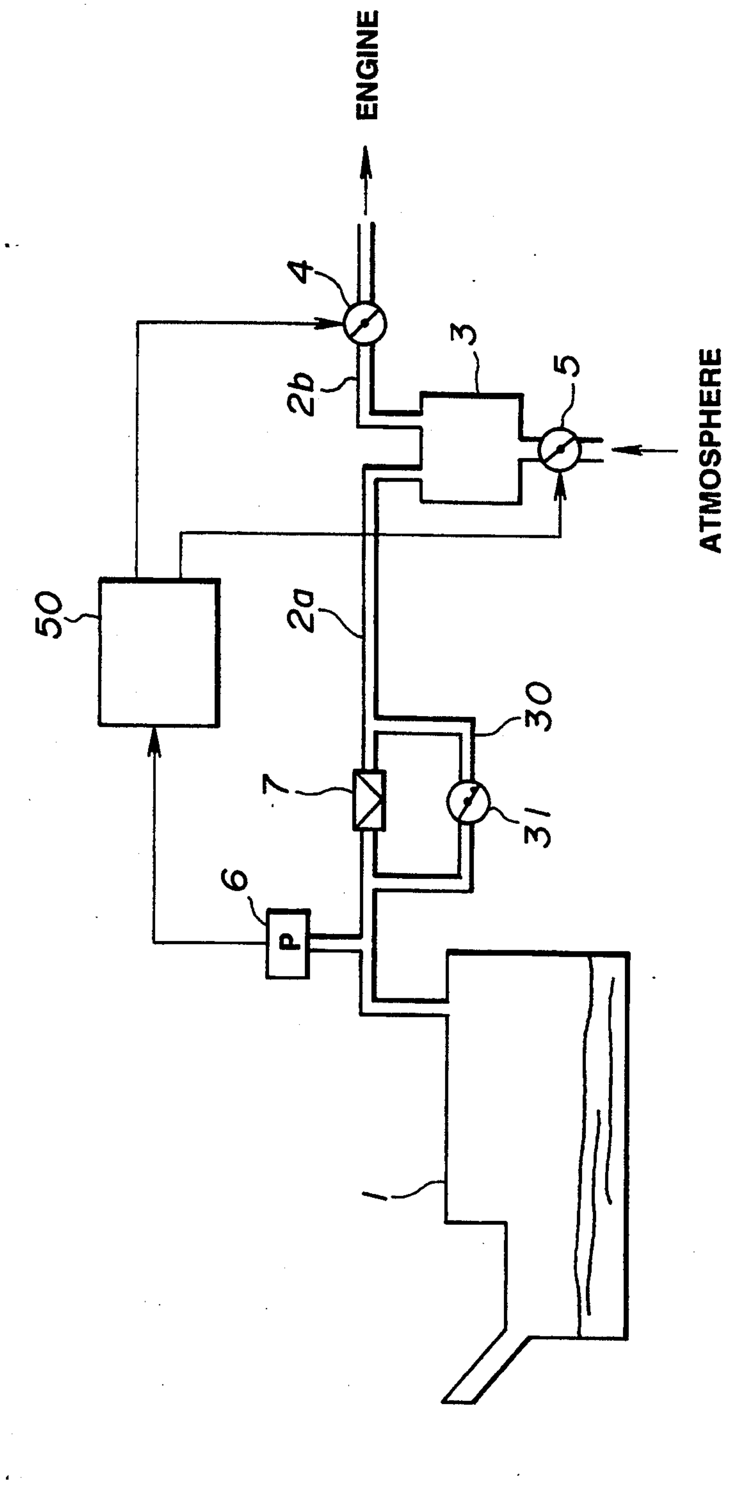
FIG. 2 is another block diagram which shows a slightly modified embodiment of FIG. 1.

In addition, if a bypass passage 30 for bypassing the check valve 7 and a bypass valve 31 formed in the way of the bypass passage 30 are installed in the system of the first embodiment as shown in FIG. 2, by opening the bypass valve 31 at the step S1010, the effect of the opening pressure of the check valve 7 is canceled. Accordingly, a high accuracy in a leak diagnosis is obtained due to the change of the error generated by a position of a leakage.

Figure 7:
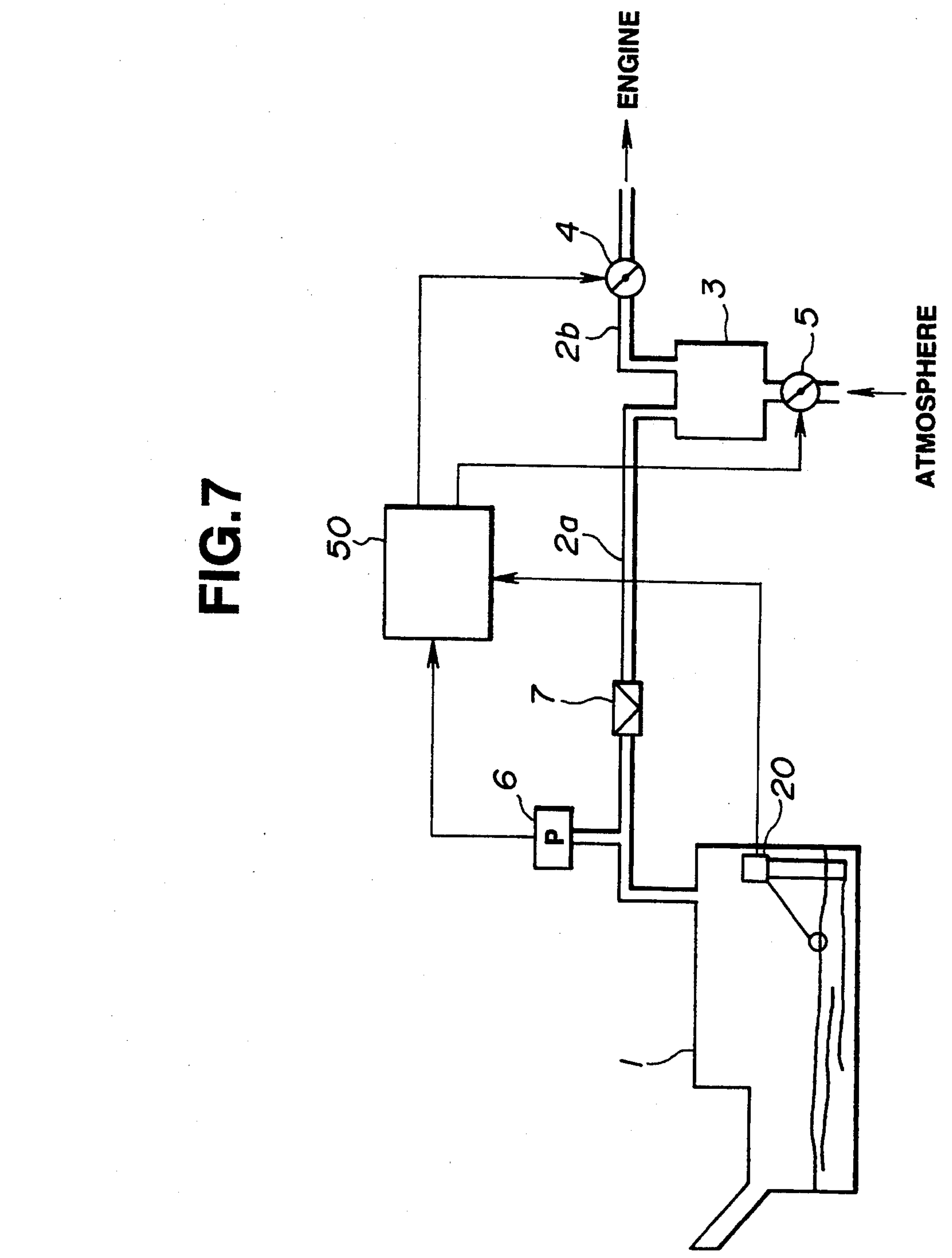
FIG. 7 is a schematic view which shows a construction of a second embodiment of the leak diagnosis system according to the present invention.
Figure 8:
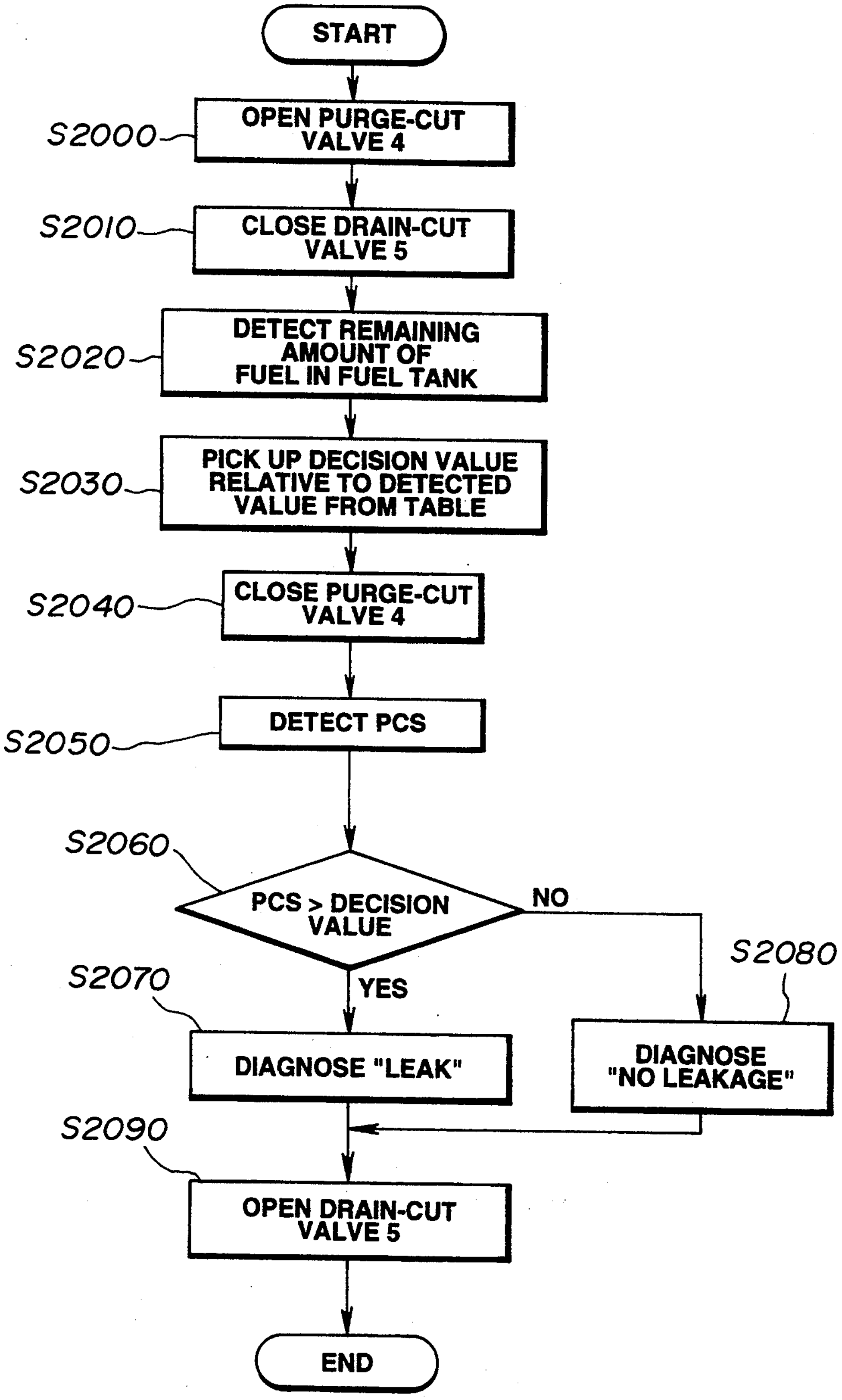
FIG. 8 is a flow chart applied to a control of the second embodiment.
Figure 9:
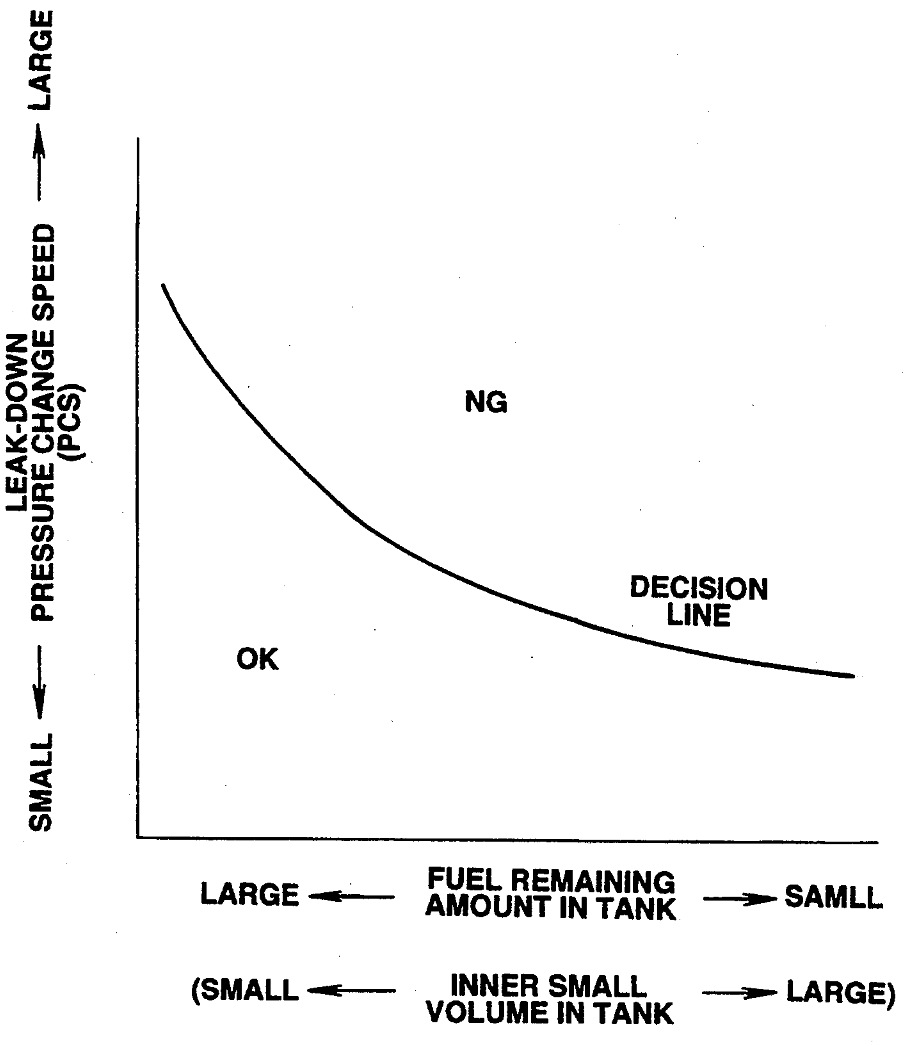
FIG. 9 is a map used in the second embodiment for a decision of the leakage in the evaporative emission control system.

Referring to FIGS. 7 to 9, there is shown a second embodiment of the leak diagnosis system according to the present invention.

As shown in FIG. 7, the construction of the second embodiment is generally similar to that of the first embodiment except that a fuel remaining amount detector 20 is installed in the fuel tank 1. The fuel remaining amount detector 20 outputs a signal indicative of a remaining amount of fuel in the fuel tank 1 to the engine control unit 50.

A map shown in FIG. 9 is stored in a memory of the engine control unit 50 in order to diagnose a leakage of evaporative fuel from the evaporative emission control system. The engine control unit 50 is arranged to diagnose the leak condition of the evaporative emission control system on the basis of the map and the calculated PCS.

In the map the decision line for diagnosing leakage from the evaporative emission control system is determined according to the remaining fuel amount in the fuel tank 1 (which is in reverse corresponding to the inner space volume of the fuel tank 1) and the PCS (pressure changing speed) in the inner space volume since the fuel remaining amount detector 20 detects the remaining amount of fuel in the fuel tank 1.

The manner of operation of the leak diagnosis operations implemented by the engine control unit 50 will be discussed hereinafter with reference to a flow chart of FIG. 8.

In a step S2000 the purge-cut valve 4 is opened under a predetermined engine operating condition to communicate the evaporative fuel conduit **2*b* and the engine. Due to the intake negative pressure in the engine, the evaporative fuel stored in the canister 3** is purged into the engine.

In a step S2010 the drain-cut valve 5 is closed. Accordingly, the pressure condition of the evaporative emission control system is put into a negative pressure condition.

In a step S2020 the remaining fuel amount in the fuel tank 1 is obtained by the engine control unit 50 according to the signal from the fuel remaining amount detector 20. The fuel remaining amount detector 20 functions as an inner space volume detecting means.

In a step S2030 the decision value of the pressure buildup speed in the inner space volume, which is defined by closing the purge-cut valve 4, is picked up relative to the pressure drop speed from the map of FIG. 9.

In a step S2040, the purge-cut valve 4 is closed.

In a step S2050, the engine control unit 50 monitors the pressure change in the inner space on the basis of the signal of the pressure sensor 6 and detects the pressure changing speed (pressure buildup speed) toward the atmospheric pressure.

In a step S2060, it is judged whether the detected pressure buildup speed is larger than the decision value or not. When the judgment in the step S2060 is "YES", the program proceeds to a step S2070 wherein it is judged that the system is in a leak condition. When the judgment in the step S2060 is "NO", the program proceeds to a step S2080 wherein it is judged that the system is-in a no-leak condition. The steps S2030, S2060, S2070 and S2080 constitute an evaporative fuel leak diagnosis means.

Following the operation of the step S2070 or S2080, the program proceeds to a step S2090 wherein the drain-cut valve 5 is opened.

With the thus arranged leak diagnosis system, the inner space volume in the evaporative emission control system is detected by detecting the remaining fuel amount in the fuel tank 1. Accordingly, the leak diagnosis of the evaporative fuel in the evaporative emission control system is finely implemented while removing the effect of the amount of the fuel remained in the fuel tank 1.

Referring to FIGS. 10 to 14, there is shown a third embodiment of the leak diagnosis arrangement according to the present invention.

The construction of the third embodiment is the same as that of the second embodiment. Accordingly, in this section the explanation of the construction of the third embodiment is omitted herein.

Figure 10:
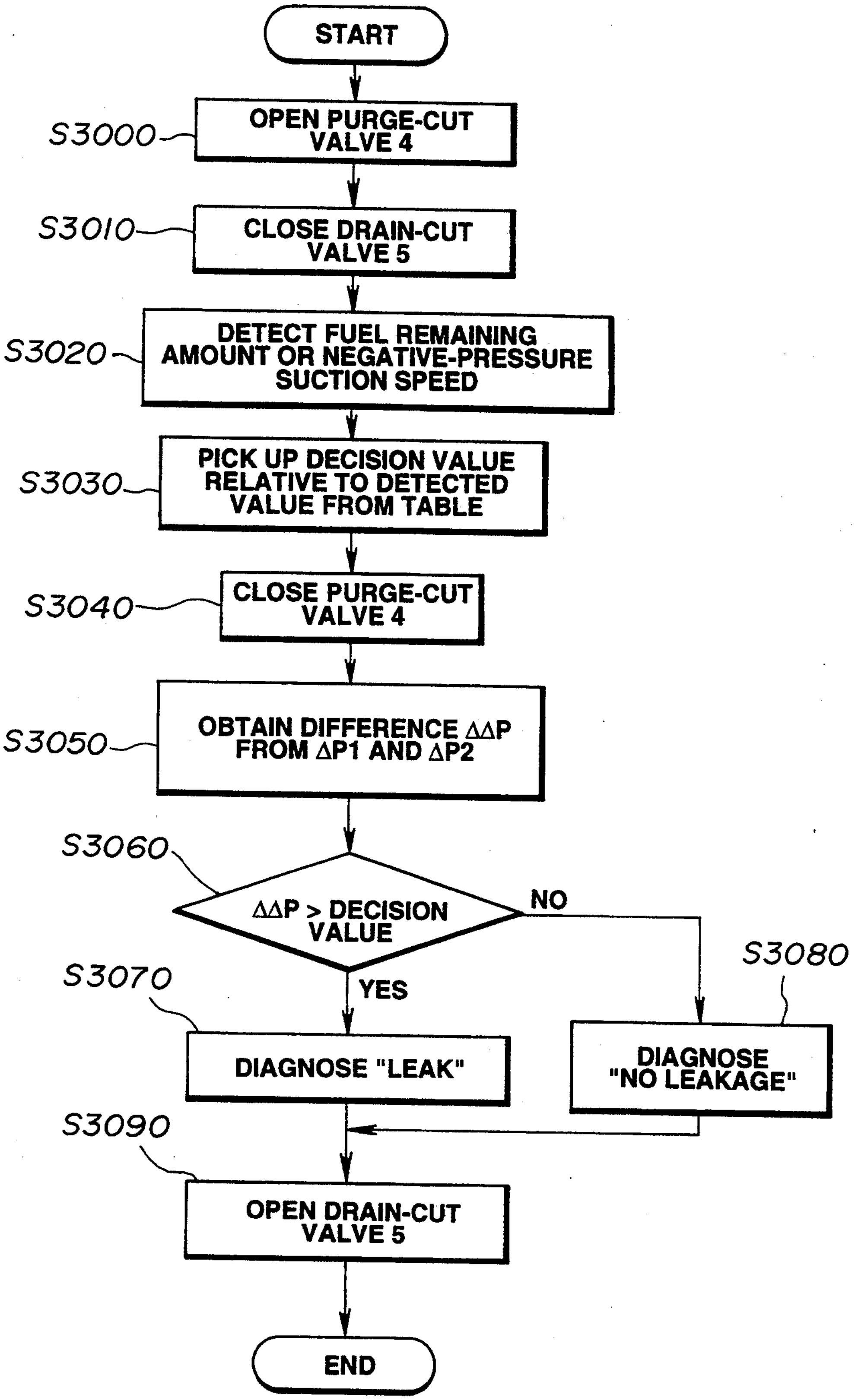
FIG. 10 is a flow chart applied to a control of a third embodiment.

The manner of operation of the leak diagnosis of evaporative fuel implemented by the engine control unit 50 will be discussed hereinafter with reference to a flow chart of FIG. 10.

In a step S3000 the purge-cut valve 4 is opened under a predetermined engine operating condition to communicate the evaporative fuel conduit 2*b* and the engine. Due to the intake negative pressure in the engine, the evaporative fuel adsorbed in the canister 3 is purged into the engine.

In a step S3010 the drain-cut valve 5 is closed. Accordingly, the pressure condition of the evaporative emission control system is put into a negative pressure condition.

In a step S3020 the remaining fuel amount in the fuel tank 1 is obtained by the engine control unit 50 according to the signal from the fuel remaining amount detector 20. The fuel remaining amount detector 20 functions as an inner space volume detecting means.

Figure 14:
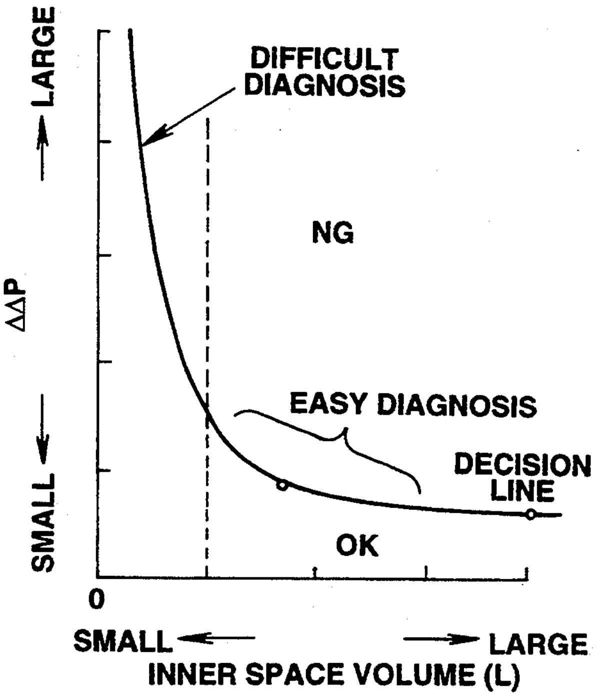
FIG. 14 is a map used in the third embodiment for a decision of the leakage in the evaporative emission control system.

In a step S3030 the decision value of a difference ($\Delta\Delta P = \Delta P1 - \Delta P2$) of the PCS in the inner space volume, which is a closed space defined by closing the purge-cut valve 4, is picked up from a map of FIG. 14 relative to the pressure drop speed.

In a step S3040, the purge-cut valve 4 is closed.

In a step S3050, the engine control unit 50 monitors the pressure change in the inner space of the evaporative emission control system on the basis of the signal of the pressure sensor 6 and detects the pressure changing speed. (pressure buildup speed) toward the atmospheric pressure. In addition, a difference ($\Delta\Delta P = \Delta P1 - \Delta P2$) between the PCS ($\Delta P1$) near the predetermined negative pressure and the PCS ($\Delta P2$) near the atmospheric pressure is obtained. Although the difference between the PCS at two points has been obtained in this embodiment, it will be understood that a gradient obtained by a single regression analysis of PCS at two or more points may be used instead of the difference of this embodiment.

Figure 12:
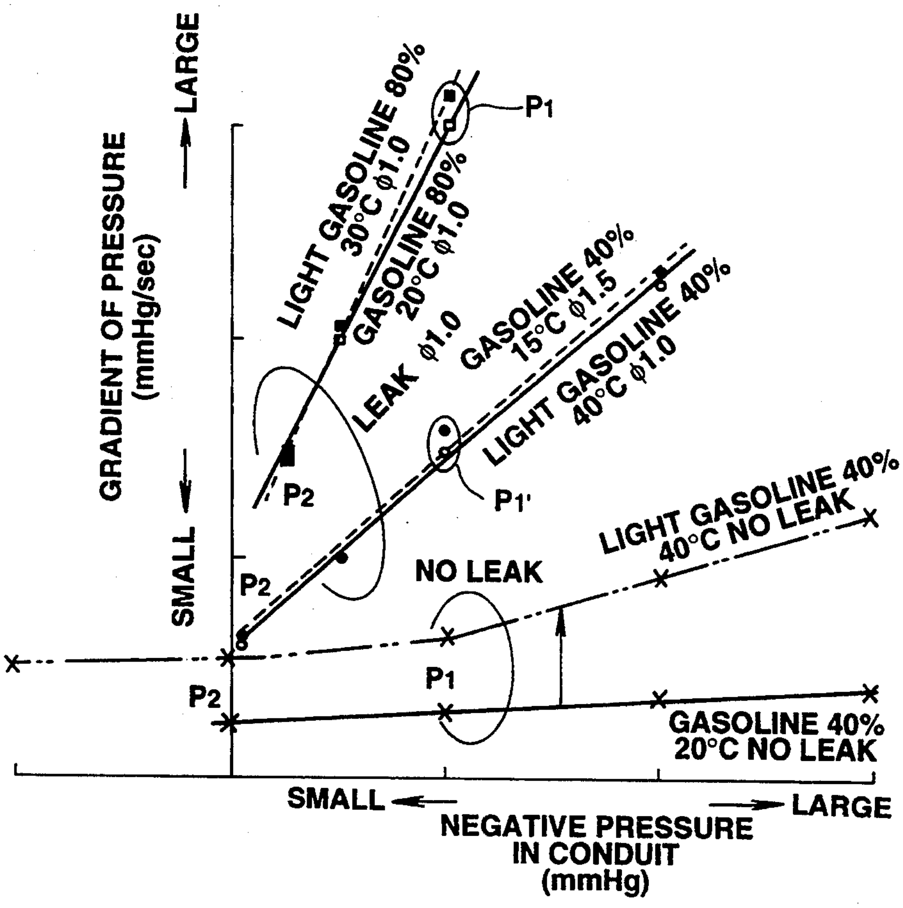
FIG. 12 is a graph which shows a relationship between a pressure in the evaporative emission control system and a pressure changing speed in the inner space.

More particularly, even if the evaporative fuel pressure is increased by the generation of the fuel vapor, the straight line (a line crossing with the points $\Delta P1$ and $\Delta P2$) of the PCS relative to the pressure in the inner space volume tends to move in parallel by the increased fuel vapor pressure, and to generally keep the gradient of the PCS, as shown in FIG. 12. That is, the gradient of the PCS is almost not effected by the fuel vapor pressure and depends on the inner space volume.

Figure 13:
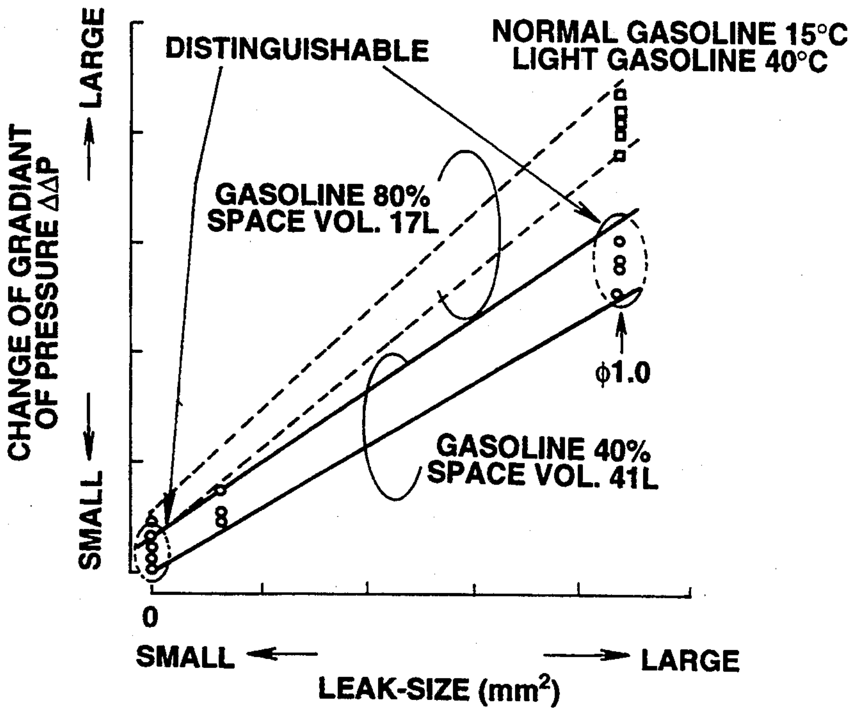
FIG. 13 is a graph which shows a relationship between a leakage portion size and a difference of two pressure changing speeds shown in FIG. 11.

The relationship between the change of the gradient of the PCS and a leak portion size was obtained as shown in FIG. 13 in a manner to investigate the effect of the change of the gradient of the PCS relative to a leak portion size. Accordingly, a map as shown in FIG. 14, which takes the fuel vapor pressure into the consideration, is prepared.

In a step S3060, it is judged whether the obtained difference $\Delta\Delta P$ is larger than the decision value or not. When the judgment in the step S3060 is "YES", the program proceeds to a step S3070 wherein it is judged that the system is in a leak condition. When the judgment in the step S3060 is "NO", the program proceeds to a step S3080 wherein it is judged that the system is in a no-leak condition. The steps S3030, S3060, S3070 and S3080 constitute an evaporative fuel leak diagnosis means.

Following the operation of the step S3070 or S3080, the program proceeds to a step S3090 wherein the drain-cut valve 5 is opened.

With the thus arranged leak diagnosis system, the inner space volume in the evaporative emission control system is determined by detecting the remaining fuel amount in the fuel tank 1. Accordingly, the leak diagnosis of the evaporative fuel from the evaporative emission control system is finely implemented while taking the effect of the amount of the fuel remained in the fuel tank 1 and the fuel vapor pressure into consideration.

Although in the third embodiment the effect of the fuel remaining amount in the fuel tank 1 has been removed by obtaining the remaining amount by means of the fuel remaining amount detector 20, it will be understood that such the effect may be removed by applying a combination of the gradient of the PCS and one of the pressure drop speed and the pressure buildup speed.

Furthermore, the detection of the inner space volume is available in order to arrange the leak diagnosis system according to the present invention so as not to implement the leak diagnosis when liquid fuel is sucked from the fuel tank 1.

Figure 15:
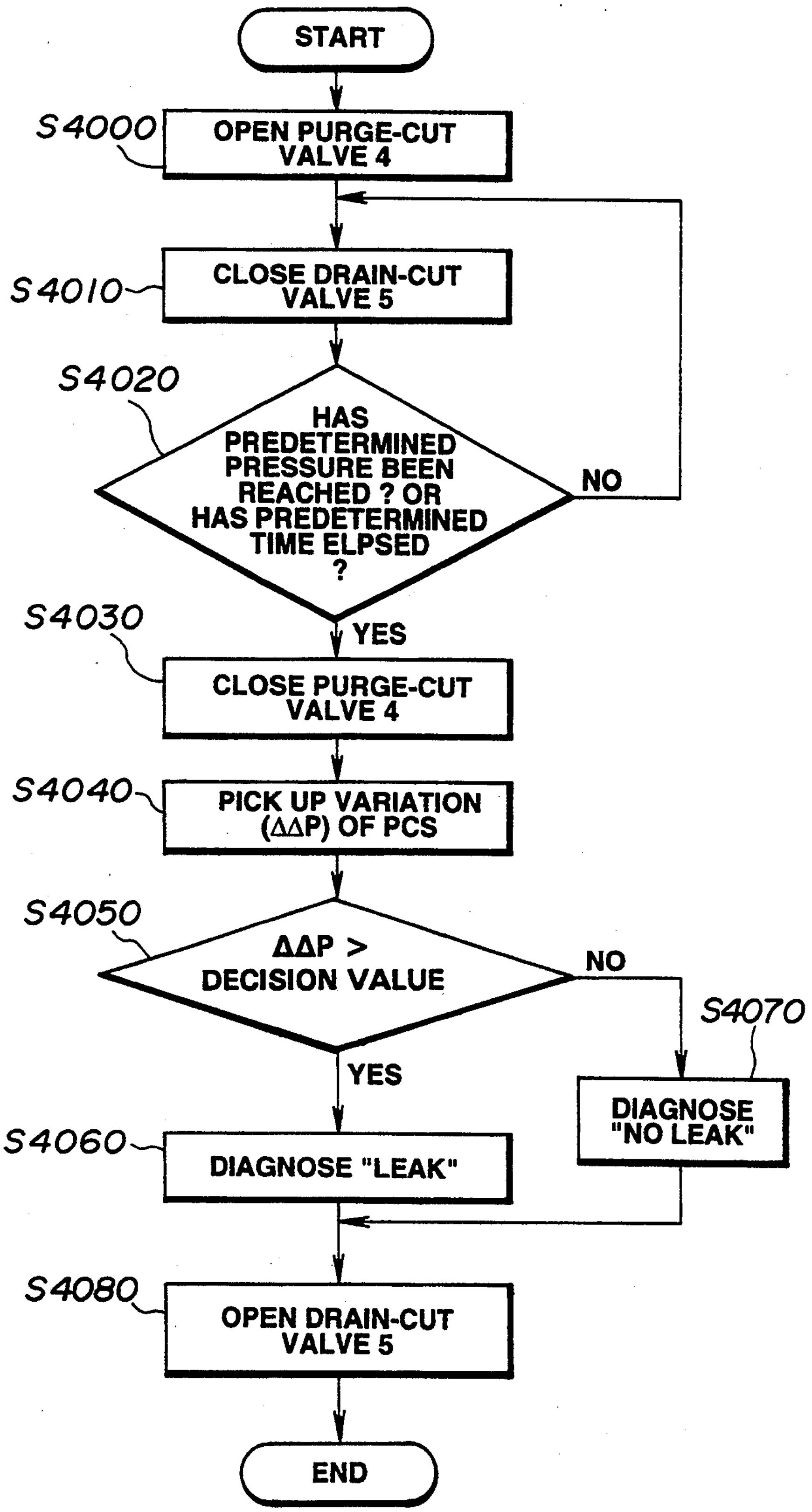
FIG. 15 is a flow chart applied to a control of a fourth embodiment.
Figure 16:
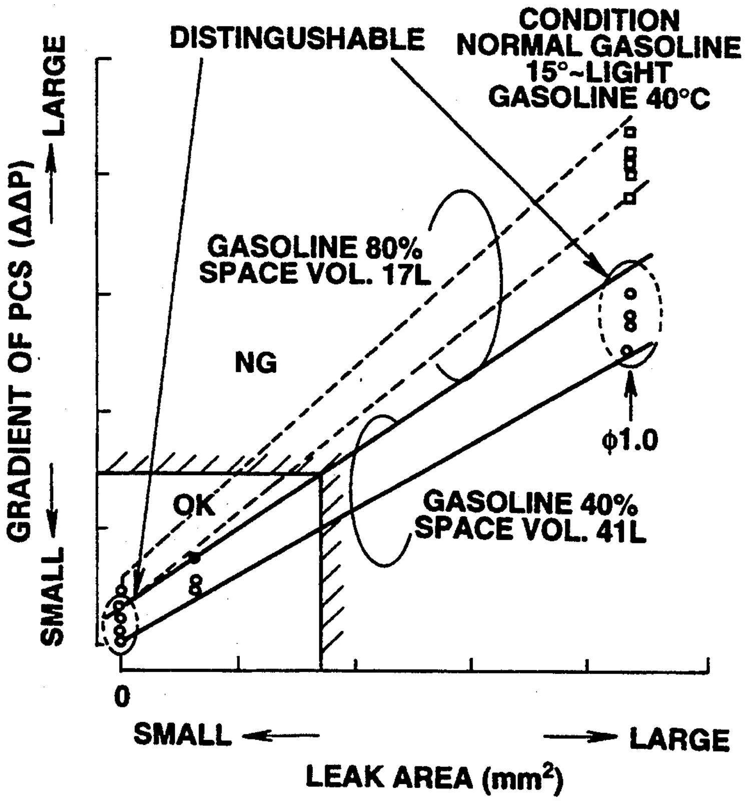
FIG. 16 is a map used in the fourth embodiment for a decision of the leakage in the evaporative emission control system.
Figure 17:
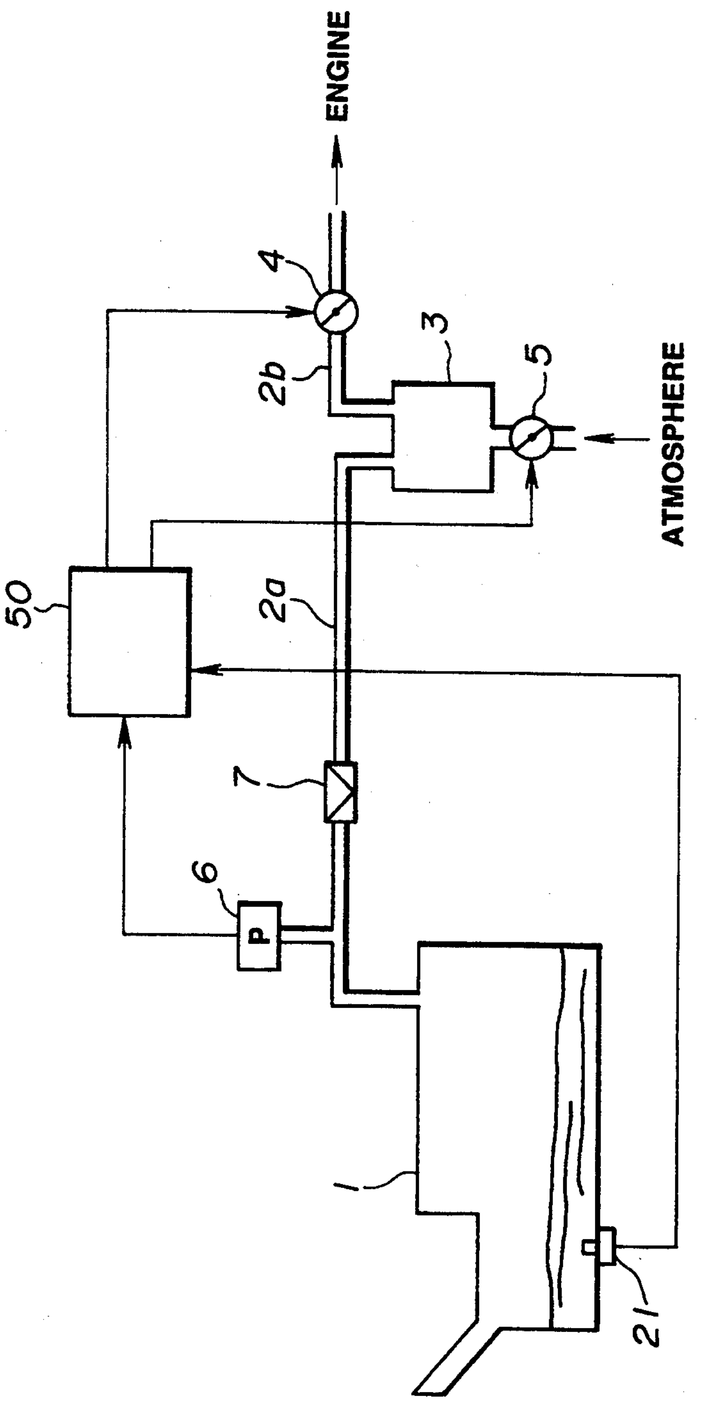
FIG. 17 is a schematic view which shows a construction of a fifth embodiment of the leak diagnosis system according to the present invention.

Referring to FIGS. 15 and 16, there is shown a fourth embodiment of the leak diagnosis system for the evaporative emission control system according to the present invention.

The construction of the fourth embodiment is generally similar to that shown in FIGS. 1 and 2 except that a variation of the PCS (pressure changing speed) is used for a diagnosis of the leakage in the evaporative emission control system.

Figure 11:
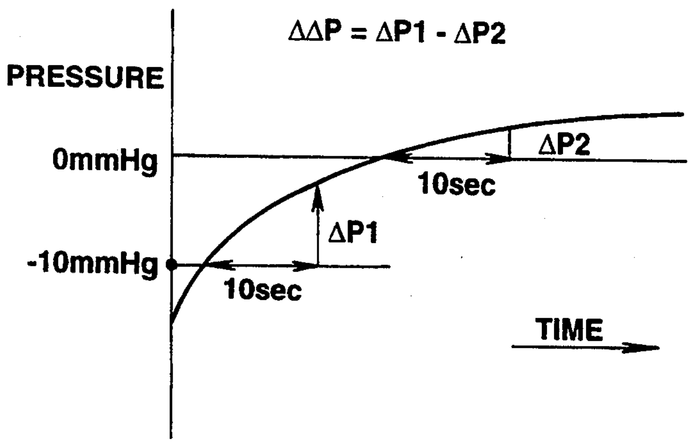
FIG. 11 is a graph which shows a change of the pressure changing speed.

Practically, when the pressure in the closed evaporative emission control system is changed from the negative pressure toward the atmospheric pressure, a difference ($\Delta\Delta P = \Delta P1 - \Delta P2$) between the PCS ($\Delta P1$) near the predetermined negative pressure and the PCS ($\Delta P2$) near the atmospheric pressure is obtained by the engine control unit 50 upon receipt of the signal from the pressure sensor 6 as is similar to FIG. 11 of the third embodiment. Although the difference between the PCS at two points has been obtained in fourth embodiment, it will be understood that a gradient obtained by a single regression analysis of PCS at two or more points may be used instead of the difference of this embodiment.

More particularly, even if the evaporative fuel pressure is increased by the generation of the fuel vapor, the straight line (a line crossing with the points $\Delta P1$ and $\Delta P2$) of the PCS relative to the pressure in the inner space volume tends to move in parallel by the increased fuel vapor pressure, and to generally keep the gradient of the PCS, as shown in FIG. 12. That is, the gradient of the PCS is almost not effected by the evaporative fuel pressure and depends on the inner space volume.

The relationship between the change of the gradient of the PCS and a leak portion size is obtained as shown in FIG. 16 by investigating the effect of the change of the gradient of the PCS relative to a leak portion size. Accordingly, the graph shown by FIG. 16 can be used as a leak-decision map which is taking the fuel vapor pressure into the consideration.

The manner of operation of the leak diagnosis of evaporative fuel implemented by the engine control unit 50 will be discussed hereinafter with reference to a flow chart of FIG. 15.

In a step S4000 the purge-cut valve 4 is opened under a predetermined engine operating condition to communicate the evaporative fuel conduit 2*b* and the engine. Due to the intake negative pressure in the engine, the evaporative fuel adsorbed in the charcoal canister 3 is purged into the engine.

In a step S4010 the drain-cut valve 5 is closed. Accordingly, the pressure condition of the evaporative emission control system is put into a negative pressure condition.

In a step S4020 it is judged according to the signal from the pressure sensor 6 whether the pressure in the evaporative emission control system reaches a predetermined negative pressure or not, or whether the suction operation is implemented for a predetermined time or not. When the judgment in the step S4020 is "YES", the program proceeds to a step S4030. When the judgment in the step S4020 is "NO", the program returns to the step S4010.

In the step S4030 the purge-cut valve 4 is closed.

In a step S4040 the engine control unit 50 monitors a pressure change in the inner space on the basis of the signal from the pressure sensor 6 for measuring the PCS toward the atmospheric pressure. In addition, a difference ($\Delta\Delta P = \Delta P1 - \Delta P2$) between the PCS ($\Delta P1$) near the predetermined negative pressure and the PCS ($\Delta P2$) near the atmospheric pressure is obtained upon measuring $\Delta P1$ and $\Delta P2$. Although the difference between the PCS at two points has been obtained in this embodiment, it will be understood that a gradient obtained by a single regression analysis of PCS at two or more points may be used instead of the difference of this embodiment.

In a step S4050, it is judged whether the obtained difference $\Delta\Delta P$ is larger than the decision value or not. When the judgment in the step S4050 is "YES", the program proceeds to a step S4060 wherein it is judged that the system is in a leak condition. When the judgment in the step S4050 is "NO", the program proceeds to a step S4070 wherein it is judged that the system is in a no-leak condition. The steps S4050, S4060 and S4070 constitute an evaporative fuel leak diagnosis means.

Following the operation of the step S4060 or S4070, the program proceeds to a step S4080 wherein the drain-cut valve 5 is opened.

With the thus arranged leak diagnosis system, the leak diagnosis is implemented by obtaining a variation of the pressure changing speed which is not effected by the fuel vapor pressure. Accordingly, the leak diagnosis of the evaporative fuel in the evaporative emission control system is accurately implemented while taking the effect of the amount of the fuel remained in the fuel tank 1 and the fuel vapor pressure into consideration.

Referring to FIGS. 17 to 20, there is shown a fifth embodiment of the leak diagnosis arrangement according to the present invention.

Figure 19:
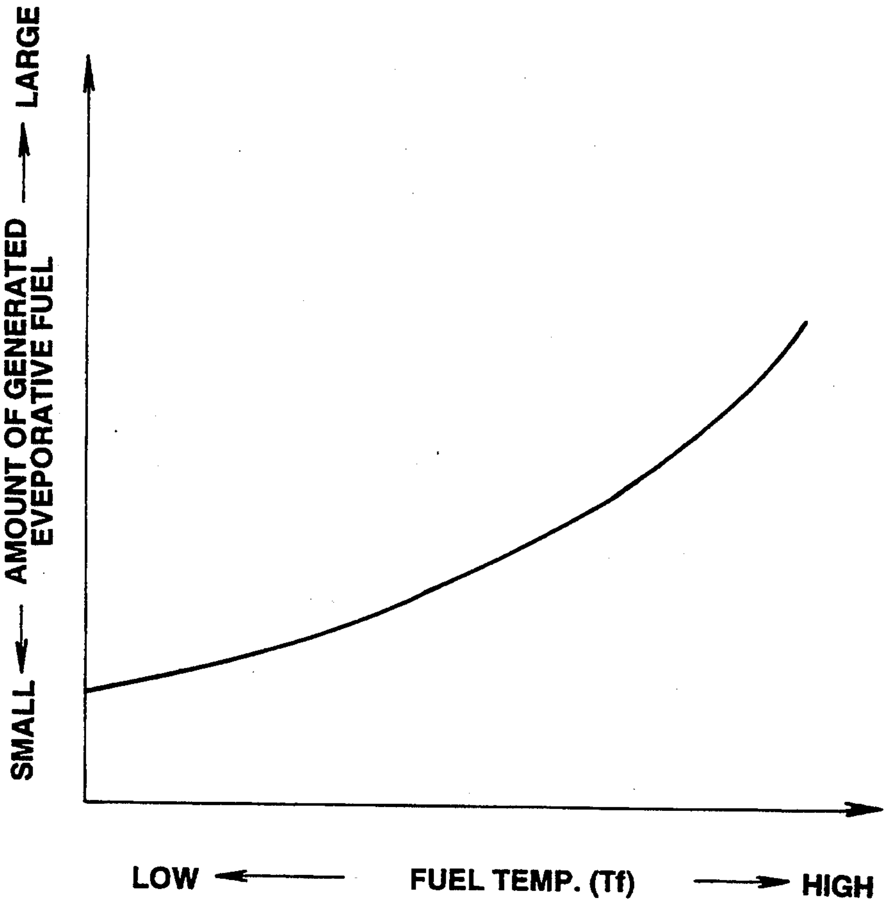
FIG. 19 is a graph which shows a relationship between a fuel temperature and a generation amount of fuel vapor.
Figure 20:
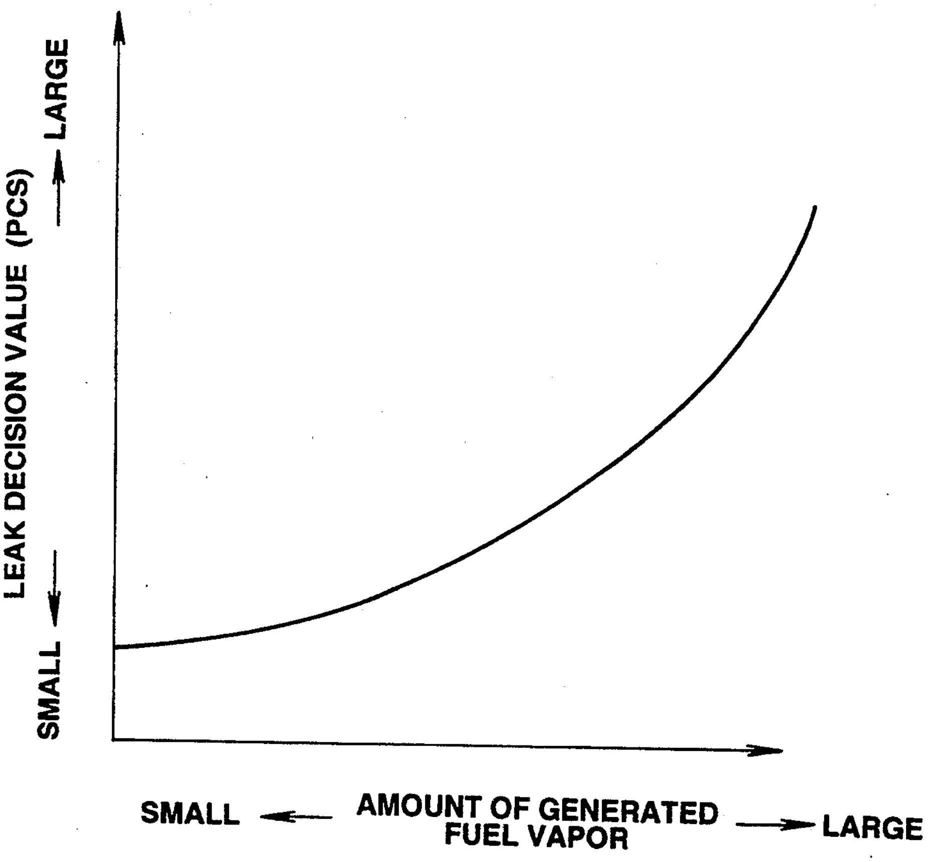
FIG. 20 is a graph used in the fifth embodiment in order to correct a decision of the leakage in the evaporative emission control system.

The construction of the fifth embodiment is generally similar to the first embodiment except that a fuel temperature sensor 21 is installed in the fuel tank 1 and detects a temperature Tf of the fuel in the fuel tank 1. The fuel temperature sensor 21 outputs a signal indicative of a fuel temperature Tf to the engine control unit 50. The engine control unit 50 calculates an amount of generated fuel vapor (or fuel vapor pressure) on the basis of the detected fuel temperature Tf as shown in FIG. 19. As is clear from the construction of the fifth embodiment, the fuel temperature sensor 21 and the engine control unit 50 constitute a fuel vapor generating amount detecting means. Further, the engine control unit 50 is arranged such that the PCS is obtained on the basis of the signal from the pressure sensor 6. A decision value for deciding the leak condition are stored in the memory of the engine control unit 50. Furthermore, the engine control unit 50 stores a correcting map as shown in FIG. 20 and corrects the decision value according to the fuel temperature Tf. The leak diagnosis of the evaporative fuel is implemented by comparing the corrected decision value with the detected pressure changing speed (PCS).

Figure 18:
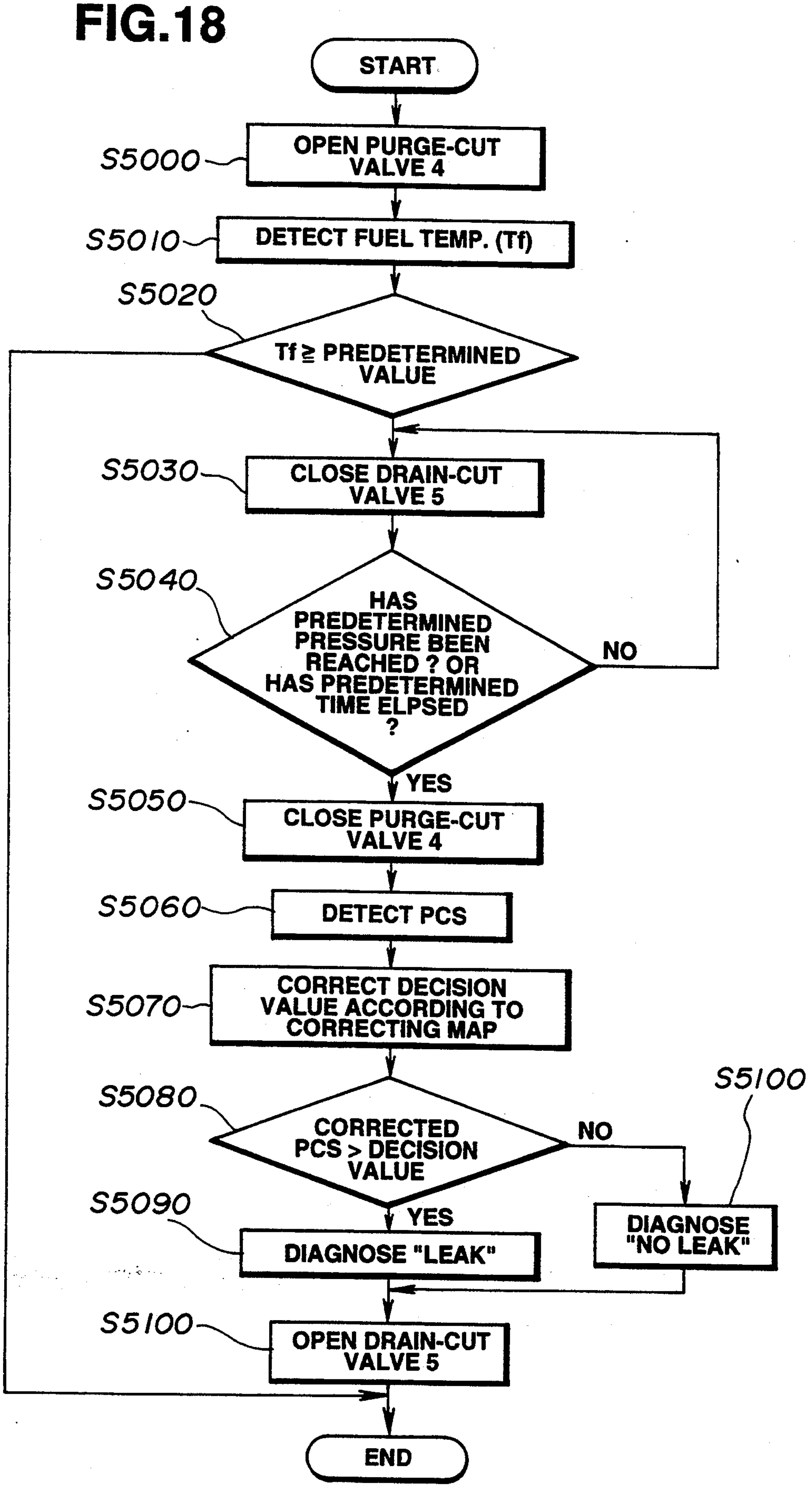
FIG. 18 is a flow chart applied to a control of the fifth embodiment.

The manner of operation of the leak diagnosis of evaporative fuel implemented by the engine control unit 50 will be discussed hereinafter with reference to a flow chart of FIG. 18.

In a step S5000 the purge-cut valve 4 is opened under a predetermined engine operating condition in order to communicate the evaporative fuel conduit 2*b* and the engine. The evaporative fuel stored in the charcoal canister 3 is purged into the engine by means of the intake negative pressure in the engine.

In a step S5010 the engine control unit 50 receives the signal indicative of the fuel temperature Tf from the fuel temperature sensor 21.

In a step S5020 it is judged whether the detected fuel temperature Tf is larger than a predetermined value or not. When the fuel temperature Tf is larger than the predetermined value, the program proceeds to a step S5030. When the fuel temperature Tf is not larger than the predetermined value, the leak diagnosis is forbidden and the program shown by the flow chart of FIG. 18 is finished.

In the step S5030 the drain-cut valve 5 is closed. Accordingly, the evaporative emission control system is put into a negative pressure condition.

In a step S5040 it is judged according to the signal from the pressure sensor 6 whether the pressure in the evaporative emission control system reaches a predetermined negative pressure or not, or whether the sucking operation is implemented for a predetermined time or not. When the judgment in the step S5040 is "YES", the program proceeds to a step S5050. When the judgment in the step S5040 is "NO", the program returns to the step S5030.

In the step S5050 the purge-cut valve 4 is closed in order to define an inner space of the evaporative emission control system.

In a step S5060 the engine control unit 50 monitors the pressure of the inner space on the basis of the signal from the pressure sensor 6 and calculates the PCS (herein pressure buildup speed is calculated) toward the atmospheric pressure.

In a step S5070 the decision value is corrected according to the correcting map of FIG. 20.

In a step S5080 it is judged whether the PCS is larger than the corrected decision value or not. When the judgment in the step S5080 is "YES", the program proceeds to a step S5090 wherein it is judged that the evaporative emission system is in a leak condition. When the judgment in the step S5080 is "NO", the program proceeds to a step S5100 wherein it is judged that the system is in a no-leak condition.

Following the operation of the step 55090 or S5100, the program proceeds to a step S5110 wherein the drain-cut valve 5 is opened.

With the thus arranged leak diagnosis system, the engine control unit 50 detects the fuel temperature Tf through the fuel temperature sensor 21 and calculates the generating amount of the fuel vapor on the basis of the detected fuel temperature. Additionally, the leak decision value is corrected according to the fuel vapor pressure. Therefore, the leak diagnosis of the evaporative fuel in the evaporative emission control system in accurately implemented.

Although in the fifth embodiment the PCS (pressure buildup speed) toward the atmospheric pressure is detected after the suction into negative pressure, it will be understood that the pressure lowering speed may be applied as PCS. Although the fuel temperature sensor 21 is applied as a fuel vapor generating amount detecting means, it will be understood that the fuel temperature may be calculated by detecting the fuel return amount from the engine to the fuel tank 1 in a manner to detect the fuel return amount by a flow meter or to estimate it from the operating condition of the engine.

Referring to FIGS. 21 to 24, there is shown a sixth embodiment of the leak diagnosis system for the evaporative emission control system according to the present invention.

Figure 21:
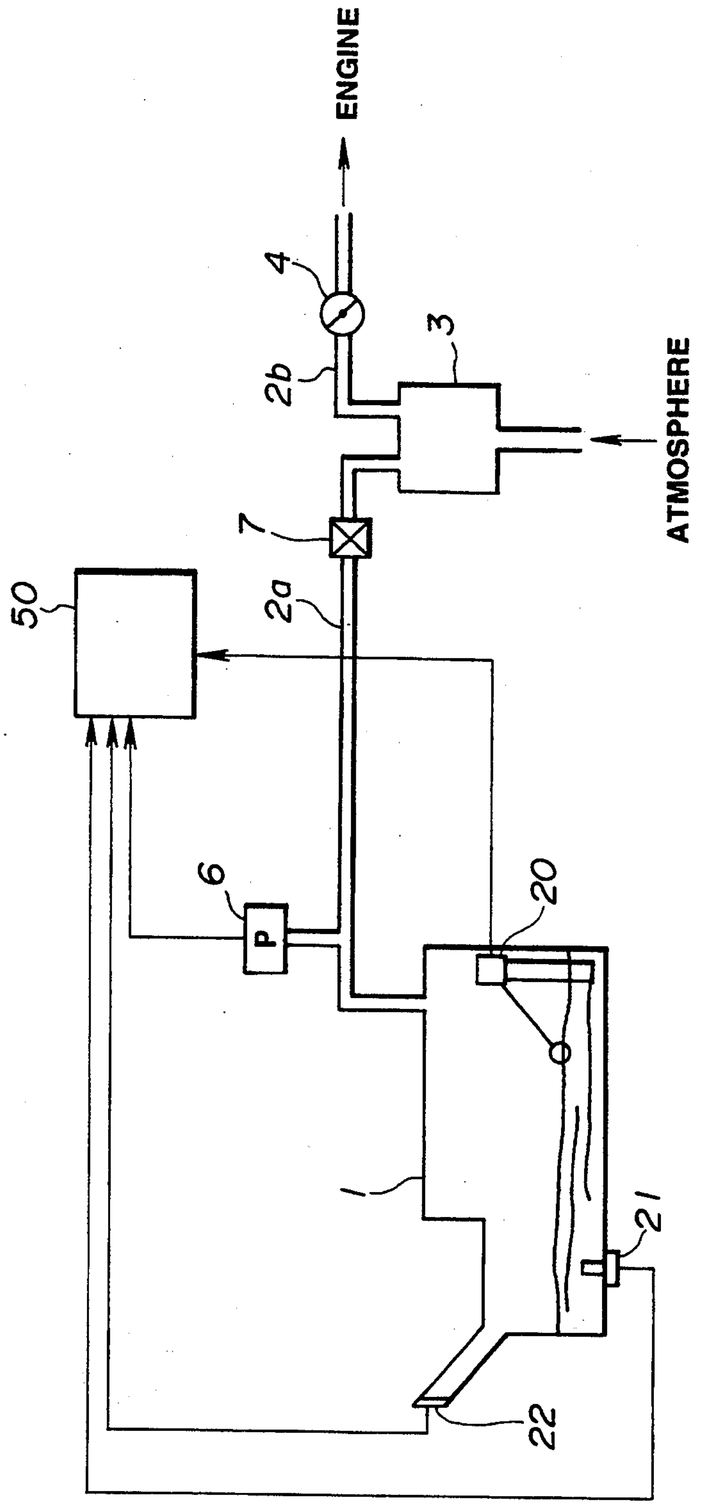
FIG. 21 is a schematic view which shows a construction of a sixth embodiment of the leak diagnosis system according to the present invention.

As shown in FIG. 21, the construction of the sixth embodiment is different from that of the fifth embodiment as follows: a fuel remaining amount detector 20 and a fuel filler cap sensor 22 are installed to the fuel tank 1; the charcoal canister 3 does not have a drain valve 5; and the purge-cut valve 2 is arranged not so as to operate during the leak diagnosis in the sixth embodiment and to operate only when the engine sucks evaporative fuel.

The pressure sensor 6 for detecting the pressure in the space between the fuel tank 1 and the charcoal canister 3 is connected to the evaporative fuel conduit 2*b* between the check valve 7 and the fuel tank 1. The pressure sensor 6 may be substituted by a pressure switch which outputs an ON signal to the engine control unit 50 when the pressure in the closed space between the fuel tank 1 and the charcoal canister 3 becomes higher than a predetermined pressure.

The fuel temperature sensor 21 is installed to the fuel tank 1 in order to detect whether the temperature of the fuel in the fuel tank 1 is higher than a predetermined temperature. The fuel temperature sensor 21 detects a fuel temperature and outputs a signal indicative of the fuel temperature to the engine control unit 50. The control unit judges on the basis of the fuel temperature whether the pressure in the closed space between the charcoal canister 3 and the fuel tank 1 is higher than the atmospheric pressure or not. That is, the fuel temperature sensor 21 functions as a leak diagnosis starting condition detecting means. The generating amount of fuel vapor in the evaporative emission control system is calculated on the basis of the fuel temperature by utilizing the phenomenon that the pressure in the closed space is raised higher than the atmospheric pressure when the temperature is higher than a predetermined temperature.

Although in the sixth embodiment the fuel temperature sensor 21 has been used to detect the fuel temperature, it will be understood that the fuel temperature may be calculated by detecting the fuel return amount from the engine to the fuel tank 1 in a manner that detects the fuel return amount by a flow meter or that estimates it from the operating condition of the engine. Furthermore, the leak diagnosis system may be arranged such that the leak diagnosis starting condition is decided by detecting the decrease of liquid fuel amount due to the phase change of liquid fuel into vapor during the engine stopping condition.

Additionally, in order to detect that a filler cap 23 of the fuel tank 1 has once opened and then closed, the fuel filler cap sensor 22 is installed to the filler cap 23. Since atmospheric air is led into the fuel tank 1 by opening the filler cap 23, the saturated gas condition in the fuel tank 1 is canceled, and the pressure in the closed space is raised further higher as compared with the previous saturated condition after the pressure in the fuel tank 1 is exposed to atmospheric pressure.

For example, when the pressure in the closed space is put into a negative pressure by the engine suction operation, it may happen that the pressure in the fuel tank 1 is kept at a negative pressure even though the fuel vapor is generated. In this situation, when the fuel tank 1 is once put into the atmospheric pressure, that is, when the filler cap 23 is at once opened and then closed, the leak diagnosis should be started. Accordingly, this leak diagnosis start condition detecting means is effective in order to prevent the incorrect diagnosis.

Although the fuel temperature sensor 21, the fuel remaining amount detector 20 and the filler cap sensor 22 independently function as a leak diagnosis start condition detecting means, it will be understood that the combination thereof provides the improvement of the detecting accuracy.

The engine control unit 50 monitors the pressure value in the closed space between the check valve 7 and the fuel tank 1 upon receiving the signal from the pressure sensor 6. The engine control unit 50 diagnoses the leakage of the evaporative emission control system by comparing the pressure value in the closed space and the leak decision value which is previously preset in the engine control unit 50.

Figure 22:
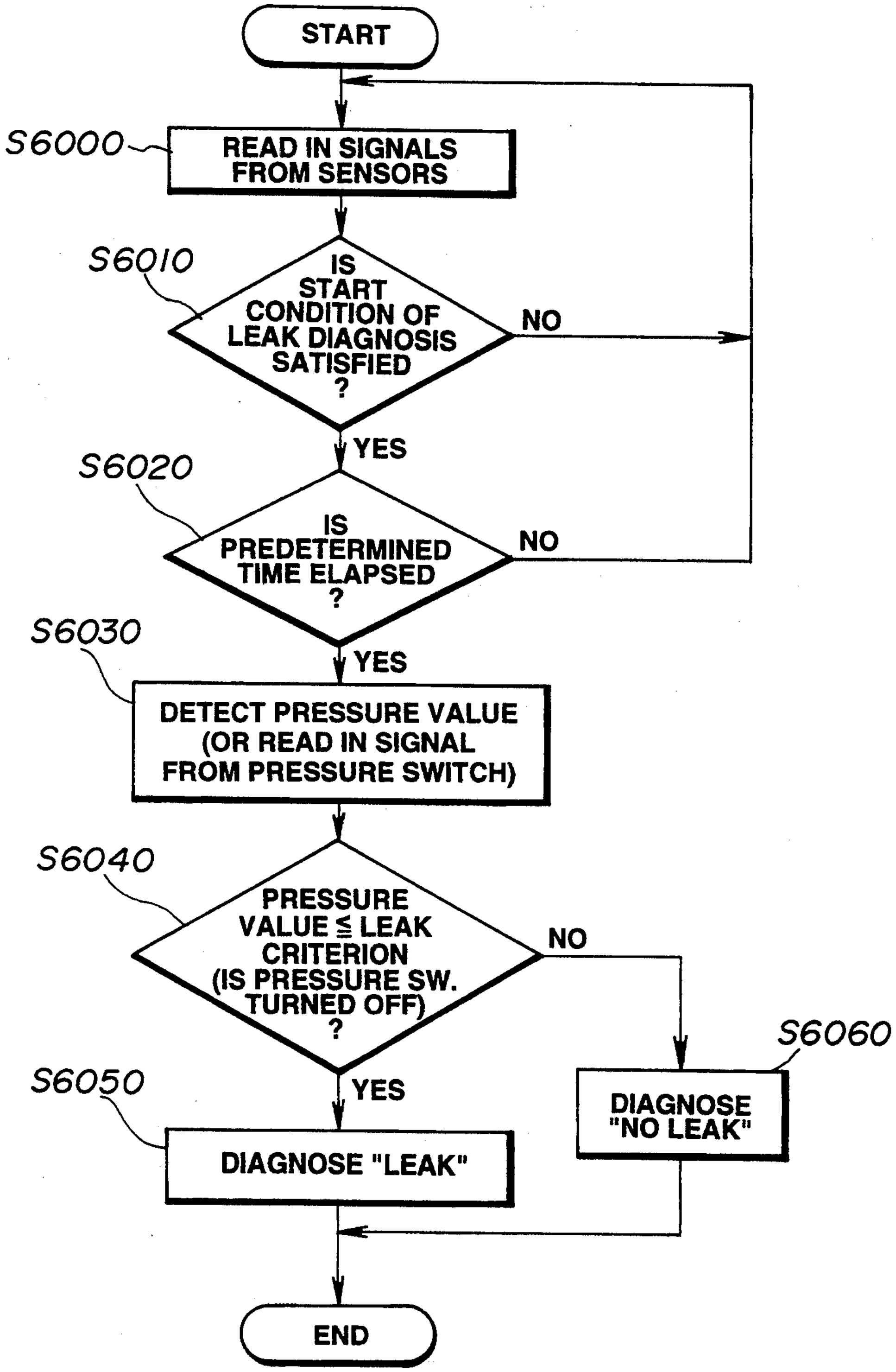
FIG. 22 is a flow chart applied to a control of the sixth embodiment.
Figure 23:
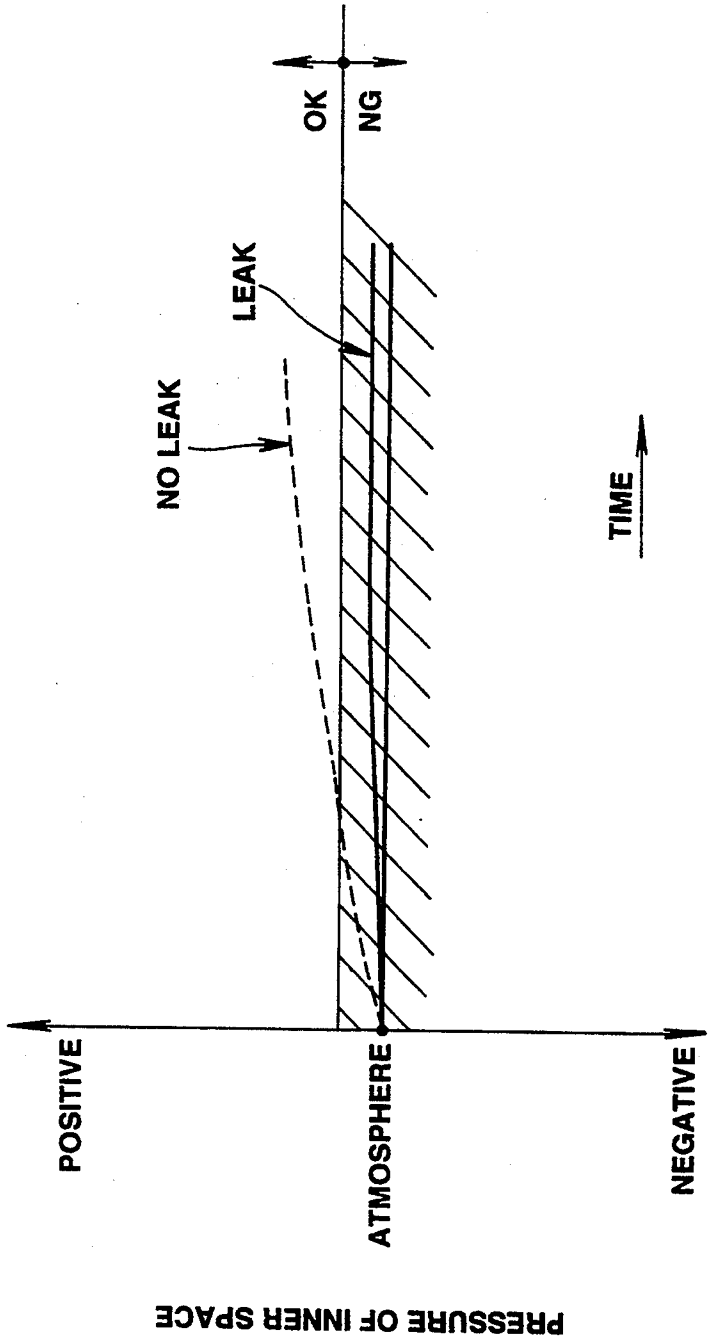
FIG. 23 is a view which shows a method for judging a condition of leakage in the sixth embodiment.
Figure 24:
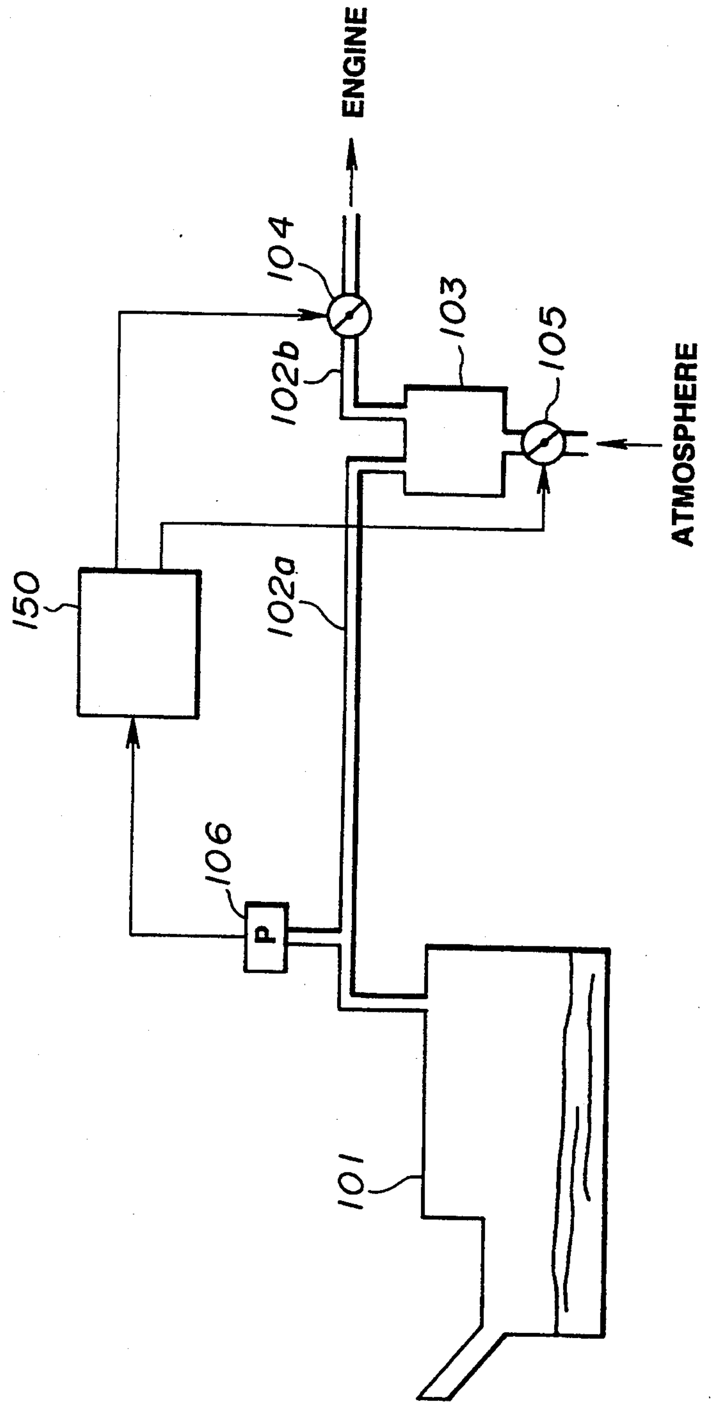
FIG.24 (PRIOR ART)
FIG. 24 is a graph which shows a change of the pressure changing speed due to the change of a generating amounts fuel vapor.
Figure 25:
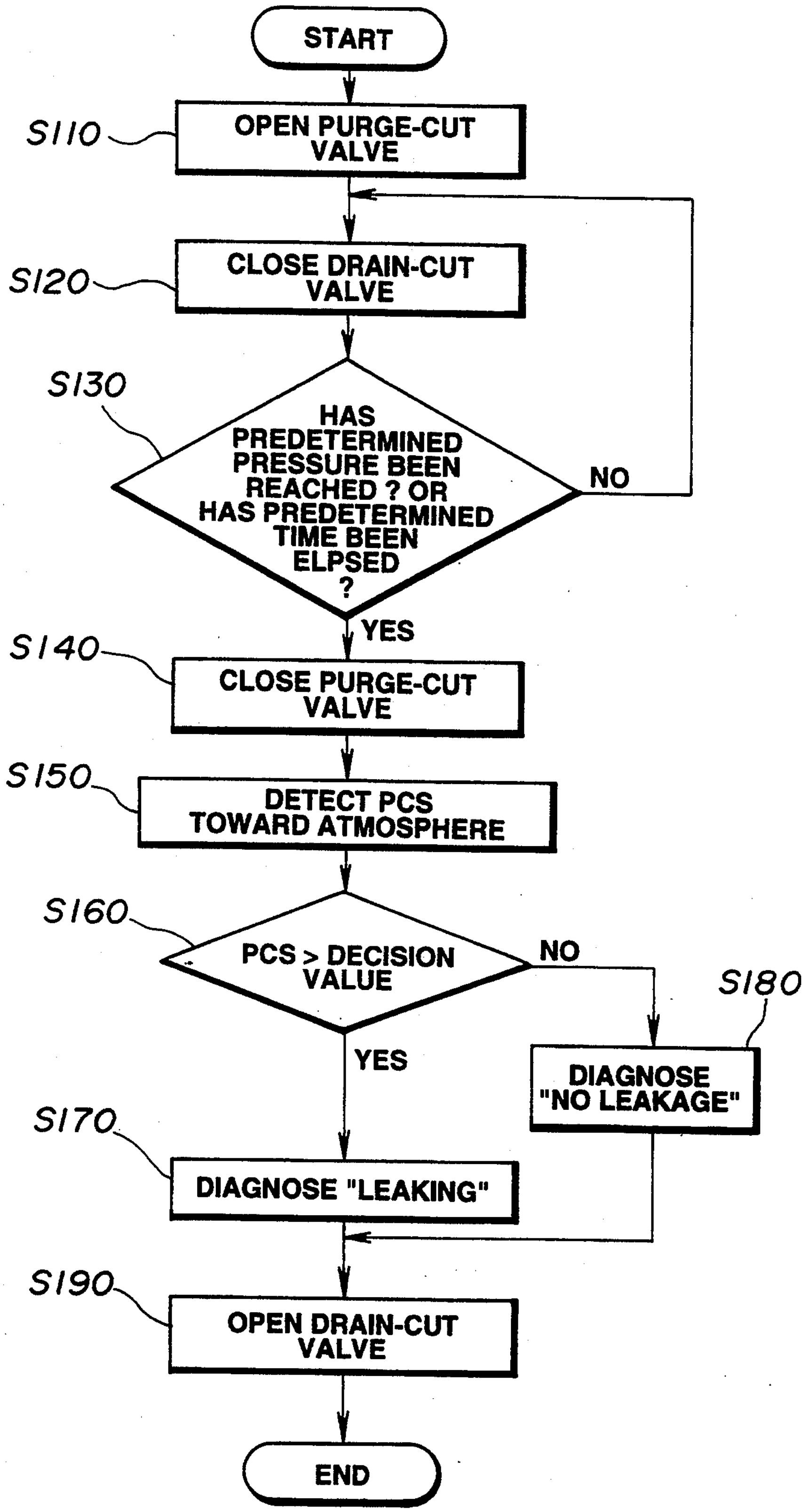
FIG.25 (PRIOR ART)
FIG. 25 is a schematic view of a conventional leak diagnosis system.
Figure 26:
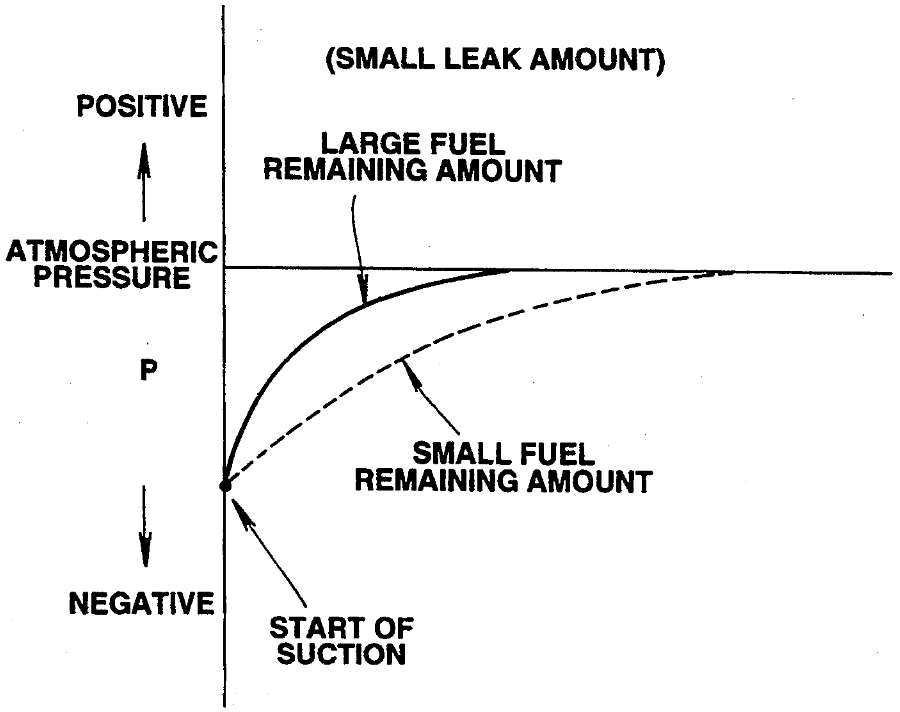
FIG.26 (PRIOR ART)
FIG. 26 is a flow chart used in the conventional leak diagnosis system of FIG. 25.
Figure 27:
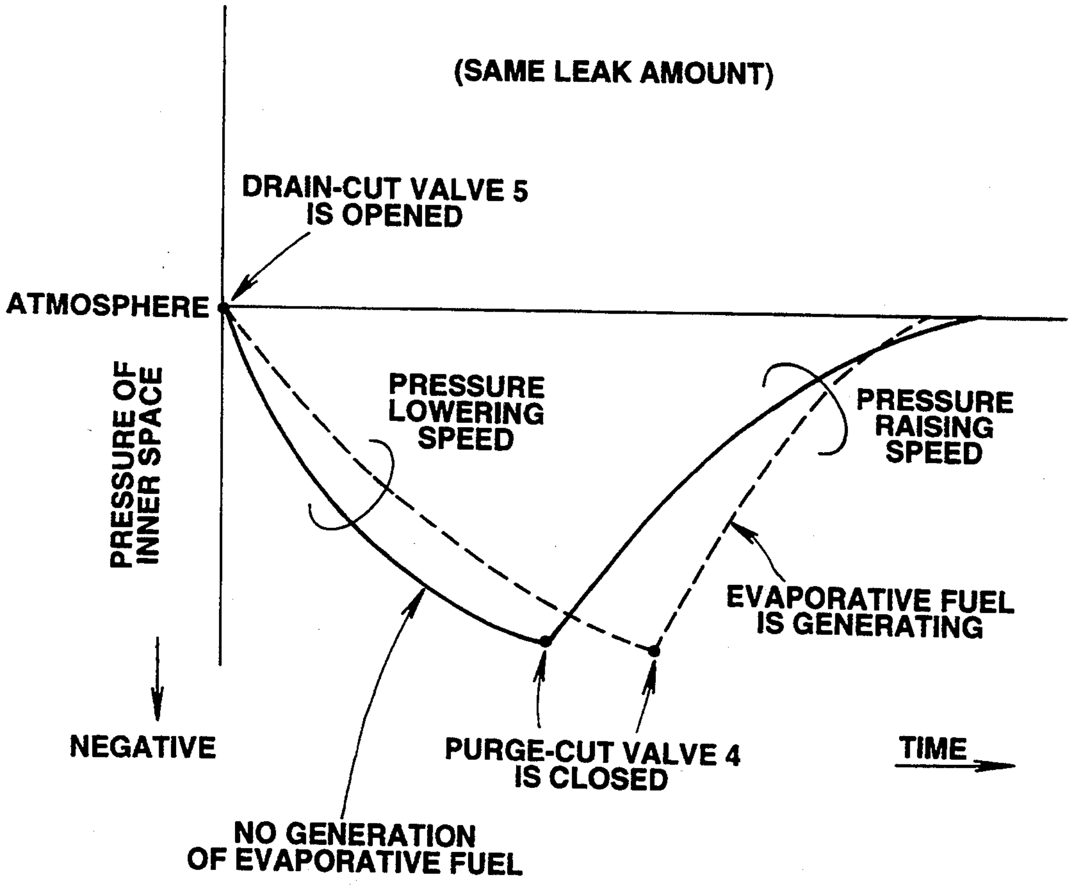
FIG.27 (PRIOR ART)
FIG. 27 is a graph which shows a change of pressure change due to the change of a fuel remaining amount in a fuel tank.

The manner of operation of the leak diagnosis system for the evaporative emission control system according to the present invention will be discussed hereinafter with reference to a flow chart of FIG. 22.

In a step S6000 the engine control unit 50 reads on various signals from sensors.

In a step S6010 it is judged whether the leak diagnosis start condition is satisfied or not. When the judgment in the step S6010 is "YES", the program proceeds to a step S62. When the judgment in the step S6010 is "NO", the program returns to the step S6000.

In the step S6020, it is judged whether a predetermined time has elapsed or not. When the predetermined time has elapsed, the program proceeds to a step S6030. When the predetermined time has not elapsed, the program returns to the step S6000.

In the step S6030 the pressure value in the space is obtained on the basis of the signal from the pressure sensor 6. It will be appreciated that the turned-on signal of the pressure switch may be read in.

In a step S6040 the obtained pressure value is compared with the leak decision value. As shown in FIG. 16, when the obtained pressure value is lower than or equal to the leak decision value, the program proceeds to a step S6050 wherein it is judged that the leak amount is larger than the allowable value. When the obtained pressure value is larger than the decision value, the program proceeds to a step S6060 wherein it is judged that the leak amount is smaller than the allowable value. It is of course appreciated that the judgment may be implemented according to the on-off signal of the pressure switch. The steps S6040, S6050 and S6060 constitute an evaporative fuel leak diagnosis system.

With the thus arranged leak diagnosis system, the leak diagnosis is implemented by positively applying the fuel vapor pressure of the evaporative fuel. Accordingly, the construction of the leak diagnosis system can be performed in a simple manner without using the drain-cut valve 5 on the charcoal cannister 3.

What is claimed is:

1. A leak diagnosis system for an evaporative emission control system of an internal combustion engine, said leak diagnosis system comprising:

a pressure detecting means detecting a pressure in the evaporative emission control system which is connected to an intake system of the internal combustion engine;

a leak diagnosis means comprising a pressure changing speed calculating means which calculates the pressure changing speed on the basis of the signal from said pressure detecting means and a fuel condition detecting means which obtains a fuel condition in the evaporative emission control system according to the pressure changing speed, said leak diagnosis means diagnosing the leak condition in the evaporative emission control system according to the fuel condition and the pressure changing speed.

2. A leak diagnosis system for an evaporative emission control system of an internal combustion engine, said leak diagnosis system comprising:

a pressure detecting means detecting a pressure in the evaporative emission control system which is connected to an intake system of the internal combustion engine;

a leak diagnosis means comprising a pressure drop speed detecting means which obtains a pressure drop speed by detecting the pressure in the evaporative emission control system upon communicating the evaporative emission control system with the intake side of the internal combustion engine and a pressure buildup speed detecting means which obtains a pressure buildup speed by detecting the pressure in the evaporative emission control system upon closing the communication between the evaporative emission control system and the internal combustion engine, said leak diagnosis means diagnosing the leak condition of the evaporative emission control system according to the detected pressure drop speed and the detected pressure buildup speed.

3. A leak diagnosis system as claimed in claim 2, wherein said leak diagnosis means diagnoses the leak condition on the basis of a variation of one of the pressure drop speed and the pressure buildup speed which variation is obtained by detecting pressure for at least two points which are different in measured time.

4. A leak diagnosis system for an evaporative emission control system of an internal combustion engine system, said leak diagnosis system comprising:

a pressure detecting means detecting a pressure in the evaporative emission control system which is connected to an intake system of the internal combustion engine;

an inner space volume detecting means detecting an inner space volume of the evaporative emission control system;

a leak diagnosis means detecting a pressure changing speed according to a signal from said pressure detecting means upon setting the pressure in the evaporative emission control system at a predetermined condition, said leak diagnosis means diagnosing the leak condition of the evaporative emission control system according to the calculated pressure changing speed and the detected inner space volume.

5. A leak diagnosis means as claimed in claim 4, wherein said inner space volume detecting means detects the inner space volume by detecting a fuel remaining amount in a fuel tank.

6. A leak diagnosis system as claimed in claim 4, wherein said leak diagnosis means diagnoses the leak condition of the evaporative emission control system according to the inner space volume and the variation of the pressure changing speeds between at least two points in the evaporative emission control system.

7. A leak diagnosis system as claimed in claim 2, wherein the evaporative emission control system comprises a check valve which is disposed between a fuel tank and a charcoal canister, a bypass passage which bypasses the check valve, and a bypass valve which is disposed in the way of the bypass passage and is opened when the leak diagnosis is implemented.

8. A leak diagnosis system as claimed in claim 4, wherein the evaporative emission control system comprises a check valve which is disposed between a fuel tank and a charcoal canister, a bypass passage which bypasses the check valve, a bypass valve which is disposed in the way of the bypass passage and opens when the leak diagnosis is implemented.

9. A leak diagnosis system for an evaporative emission control system applied to an internal combustion engine for an automotive vehicle, said leak diagnosis system comprising:

a pressure detecting means detecting a pressure in the evaporative emission control system and outputting a signal indicative of the pressure in the evaporative emission control system; and a leak diagnosing means calculating at least one of a first pressure changing speed in the evaporative emission control system when the evaporative emission control system is communicated with an intake side of the internal combustion engine and a second pressure changing speed in the evaporative emission control System when the evaporative emission control system is shut out from communication with an intake side of the internal combustion engine for plural times on the basis of the signal from the pressure detecting means, said leak diagnosing means diagnosing a leak condition of the evaporative emission control system according to the variation of the calculated first and second pressure changing speed or speeds.

10. A leak diagnosis system for an evaporative emission control system applied to an internal combustion engine for an automotive vehicle, said leak diagnosis system comprising:

a pressure detecting means detecting a pressure in the evaporative emission control system under a predetermined condition and outputting a signal indicative of the pressure in the evaporative emission control system;

a leak diagnosing means diagnosing a leak condition of the evaporative emission control system according to the signal from said pressure detecting means and a decision value which is previously stored in said leak diagnosis means;

a fuel vapor generating amount calculating means calculating the generating amount of fuel vapor in the evaporative emission control system; and a leak decision value correcting means correcting the decision value according to the calculated fuel vapor generating amount.

11. A leak diagnosis system for an evaporative emission control system applied to an internal combustion engine for an automotive vehicle, the evaporative emission control system having an evaporative fuel adsorbing means which temporally adsorbs evaporative fuel from a fuel tank and from which the adsorbed evaporative fuel is purged in the internal combustion engine under a predetermined engine operating condition, said leak diagnosis system comprising:

a check valve disposed between the evaporative fuel adsorbing means and the fuel tank, said check valve supplying the evaporative fuel from the fuel tank to the evaporative fuel adsorbing means when a pressure in the fuel tank is higher than a predetermined value;

a pressure detecting means detecting the pressure in a closed space between the fuel tank and said check valve; and a leak diagnosing means diagnosing a leak condition of the closed space according to the detected pressure and a decision value previously stored in said diagnosing means after detecting a condition that the pressure in the closed space is higher than a predetermined pressure which is higher than the atmospheric pressure.

12. A leak diagnosis system as claimed in claim 1, wherein the evaporative emission control system comprises a charcoal canister which is communicated with an intake side of the internal combustion engine through a purge conduit, a purge-cut valve being disposed in the purge conduit, said charcoal canister being communicated with a fuel tank through an adsorbing conduit through a check valve.

13. A leak diagnosis system as claimed in claim 2, wherein said leak diagnosis means calculates first pressure build up speed near a predetermined negative pressure and a second pressure build up speed near the atmospheric pressure on the basis of the signal from said pressure detecting means, said leak diagnosis means calculating a difference between the first pressure changing speed and the second pressure changing speed, said leak diagnosis comparing the calculated difference with a predetermined decision value for judging the leakage of the evaporative emission control system.

14. A leak diagnosis system for an evaporative emission control system of an internal combustion engine, said leak diagnosis system comprising:

a pressure detecting means for detecting a pressure in the evaporative emission control system which is connected to an intake system of the internal combustion engine and outputting a signal indicative of the pressure in the evaporative emission control system;

a pressure changing speed calculating means for calculating first pressure changing speed near a predetermined negative pressure and a second pressure changing speed near the atmospheric pressure on the basis of the signal from said pressure detecting means;

a difference calculating means for calculating a difference between the first pressure changing speed and the second pressure changing speed; and a comparing means for comparing the difference calculated in said difference calculating means with a predetermined decision value in order to diagnose the leakage of the evaporative emission control system.

15. A leak diagnosis system for an evaporative emission control system of an internal combustion engine, said leak diagnosis system comprising:

pressure detecting means for detecting a pressure in the evaporative emission control system which is connected to an intake system of the internal combustion engine and outputting a signal indicative of the pressure in the evaporative emission control system;

a pressure changing speed calculating means for calculating pressure changing speed on the basis of the signal from said pressure detecting means;

a calculating means for calculating a gradient of the pressure changing speed by means of a single regression analysis upon detecting the pressure changing speed for at least two points; and a comparing means for comparing the gradient with a predetermined decision value in order to diagnose the leakage of the evaporative emission control system.

* * * * *